United States Patent
Davidi et al.

(10) Patent No.: US 10,534,918 B1
(45) Date of Patent: Jan. 14, 2020

(54) FIRMWARE VERIFICATION

(71) Applicant: VDOO CONNECTED TRUST LTD., Tel Aviv (IL)

(72) Inventors: Netanel Davidi, Tel Aviv (IL); Uri Alter, Tel Aviv (IL); Asaf Karas, Tel Aviv (IL); Omer Schory, Givatayim (IL)

(73) Assignee: VDOO CONNECTED TRUST LTD., Tel Aviv (IL)

( * ) Notice: Subject to any disclaimer, the term of this patent is extended or adjusted under 35 U.S.C. 154(b) by 0 days.

(21) Appl. No.: 16/525,884

(22) Filed: Jul. 30, 2019

Related U.S. Application Data

(60) Provisional application No. 62/713,083, filed on Aug. 1, 2018.

(51) Int. Cl.
| | | |
|---|---|---|
| *G06F 12/14* | (2006.01) | |
| *G06F 9/44* | (2018.01) | |
| *G06F 21/57* | (2013.01) | |
| *G06F 8/65* | (2018.01) | |
| *G06F 11/07* | (2006.01) | |

(52) U.S. Cl.
CPC .............. *G06F 21/577* (2013.01); *G06F 8/65* (2013.01); *G06F 11/0793* (2013.01)

(58) Field of Classification Search
CPC ....... G06F 21/577; G06F 8/65; G06F 11/0793
USPC ...................... 726/25; 713/188; 717/124, 127
See application file for complete search history.

(56) References Cited

U.S. PATENT DOCUMENTS

| | | | | |
|---|---|---|---|---|
| 7,702,896 B1* | 4/2010 | Polyudov | ................ | G06F 8/654 |
| | | | | 713/2 |
| 8,554,912 B1* | 10/2013 | Reeves | ................ | G06F 21/552 |
| | | | | 709/225 |
| 8,745,746 B1* | 6/2014 | Jain | ....................... | H04L 63/145 |
| | | | | 726/25 |
| 9,392,017 B2* | 7/2016 | Cui | ....................... | H04L 63/145 |
| 9,749,345 B2 | 8/2017 | Duer et al. | | |
| 9,754,112 B1 | 9/2017 | Moritz et al. | | |
| 10,225,372 B2* | 3/2019 | Itogawa | ..................... | G06F 8/65 |
| 10,416,988 B1* | 9/2019 | Kulchytskyy | ........... | G06F 13/36 |
| 2006/0191012 A1* | 8/2006 | Banzhof | ............... | G06F 21/577 |
| | | | | 726/25 |
| 2007/0250595 A1* | 10/2007 | Landfield | ............ | H04L 63/1441 |
| | | | | 709/218 |
| 2007/0271360 A1* | 11/2007 | Sahita | ................... | G06F 21/577 |
| | | | | 709/223 |

(Continued)

OTHER PUBLICATIONS

ISR for PCT/IL2019/050818 from ILPO dated Oct. 7, 2019.

*Primary Examiner* — Aravind K Moorthy

(57) ABSTRACT

A method, apparatus and product for firmware verification. The method comprises obtaining a list of libraries utilized by a firmware. The method comprises determining a set of vulnerabilities of the firmware by identifying vulnerabilities corresponding to each library of the list of libraries. The method further comprises determining a set of remedial actions for the set of vulnerabilities, the set of remedial actions including an offline remedial action and an online remedial action. The method further comprises determining for the set of vulnerabilities a combination of remedial actions based on estimated costs and estimated runtime overheads of the set of remedial actions. The method further comprises providing an output based on the combination of remedial actions.

28 Claims, 12 Drawing Sheets

(56) References Cited

U.S. PATENT DOCUMENTS

| | | | |
|---|---|---|---|
| 2008/0046877 A1* | 2/2008 | Ford | G06F 8/63 717/168 |
| 2009/0007089 A1* | 1/2009 | Rothman | G06F 8/65 717/168 |
| 2011/0087872 A1* | 4/2011 | Shah | H04L 9/3236 713/2 |
| 2011/0119765 A1* | 5/2011 | Hering | G06F 21/577 726/25 |
| 2012/0124567 A1* | 5/2012 | Landry | G06F 11/1433 717/168 |
| 2012/0144489 A1* | 6/2012 | Jarrett | G06F 21/566 726/24 |
| 2013/0111455 A1* | 5/2013 | Li | G06F 21/572 717/169 |
| 2014/0089916 A1* | 3/2014 | Gross | G06F 11/0712 718/1 |
| 2014/0173733 A1* | 6/2014 | Ford | H04W 12/12 726/23 |
| 2015/0121355 A1* | 4/2015 | Chang | G06F 8/654 717/168 |
| 2015/0358337 A1* | 12/2015 | Keller | H04W 12/12 726/23 |
| 2015/0363323 A1* | 12/2015 | Yu | G06F 8/65 711/133 |
| 2016/0156649 A1 | 6/2016 | Hayrynen et al. | |
| 2017/0010875 A1* | 1/2017 | Martinez | G06F 8/61 |
| 2017/0147629 A1* | 5/2017 | Ali | H04L 67/10 |
| 2017/0270017 A1* | 9/2017 | Li | G06F 11/2094 |
| 2018/0004506 A1* | 1/2018 | Annapureddy | G06F 8/654 |
| 2018/0048648 A1* | 2/2018 | Angelino | G06F 21/602 |
| 2018/0136921 A1* | 5/2018 | Pfleger de Aguiar | G06F 21/577 |
| 2018/0165455 A1* | 6/2018 | Liguori | G06F 21/575 |
| 2018/0309766 A1* | 10/2018 | Marnfeldt | A61N 1/37264 |
| 2019/0095623 A1* | 3/2019 | Narasimhan | G06F 21/572 |
| 2019/0163464 A1* | 5/2019 | Compton | G06F 8/65 |
| 2019/0250898 A1* | 8/2019 | Yang | G06F 8/65 |
| 2019/0294802 A1* | 9/2019 | Eacmen, III | G06F 21/577 |

* cited by examiner

Vendor
Type
Model

Product Version
Firmware File      2018-04-18-raspbian-str...       File Size        2GB
Firmware Version                                    Analysis Time    19:43

Executive Summary

36 Hardware
components identified

0 Software
components identified

87 ~910
Security Requirements
● 13 High   ● 27 Medium
○ 13 Low    ○ 34 Done

0 ~920
Vulnerabilities (CVEs)
● 0 Critical   ● 0 High
● 0 Medium    ○ 0 Low

Threat Level — High

Certification Readiness — 44%

> Hardware 36 components found

> Security Requirements 88 items found

> Recommendations 2 items found

> Additional Information

| Harden the configuration for OpenSSH server | AUTOFIX | OpenSSH | 1 | ○ | " | TO DO |

*What does it mean?* ~1110
Harden the OpenSSH server and clients by applying secure configurations. This helps implement SSH best practices and protect against common attacks.

*What can happen?*
Hardening settings reduce the attack surface, protect against remote exploitation, help against denial of service attacks, prevent root login (which is considered a risky practice), and detect against lax permissions on the user's home folder.

*What should I do?*
Set the following configurations in the OpenSSH service configuration file, typically /etc/ssh/sshd_config, to harden the SSH implementation:

ClientAliveCountMax 2
    ClientAliveInterval 0
    MaxSessions 2
    TCPKeepAlive
    UserPrivilegeSeparation-sandbox
    FingerprintHash sha256
    PermitRegtLogin Standards ~1140  ( NIST IR 7966 )  ( ENISA )  ( ENISA 4.0 )

REQSCVOPENSSHHARDEN  ~1130

*What was found?*

Negative SSH server is not configured with the best security settings available /etc/ssh/sshd_config,

| Line Number | Setting | Current | Expected |
|---|---|---|---|
| Line Number | MaxAuthTries | Missing | 2s |
| | ClientAliveCount... | Missing | ≤2 |
| | MaxSessions | Missing | ≤2 |
| | AllowTcpForwardi... | Missing | no |
| 89 | TCPKeepAlive | yes | no |
| | XT1Forwarding | Missing | no |
| | AllowAgentForw... | Missing | no |
| | LogLevel | Missing | VERBOSE |

◎   🔧 Use AutoFixer
~1120

FIG. 11

```
84   UsePAM yes
85
86   #AllowAgentForwarding yes
87   #AllowTcpForwarding yes
88   #GatewayPorts no
89   X11Forwarding yes
90   #X11DisplayOffset 10
91   #X10UseLocalhost yes
92   #PermitTTY yes
93   PrintMotd no
94   #PrintLastLog yes
95   #TCPKeepAlive yes
96   #UseLogin no
97
98   # no default banner path
99   #Banner none
100
101  #Allow client to pass locale environment variables
102  AcceptEnv LANG LC_*
103  # override default of no subsystems
104  Subsystem sftp /usr/lib/openssh/sftp-server
```

1200a

```
84   UsePAM yes
85
86   #AllowAgentForwarding yes
87   #AllowTcpForwarding yes
88   #GatewayPorts no
89   X11Forwarding no
90   #X11DisplayOffset 10
91   #X10UseLocalhost yes
92   #PermitTTY yes
93   PrintMotd no
94   #PrintLastLog yes
95   #TCPKeepAlive yes
96   #UseLogin no
97
98   # no default banner path
99   #Banner none
100
101  #Allow client to pass locale environment variables
102  AcceptEnv LANG LC_*
103  # override default of no subsystems
104  Subsystem sftp /usr/lib/openssh/sftp-server
105
106  MaxAuthTries 2s
107  ClientAliveCountMax 2
101  MaxSessions 2
102  AllowTcpForwarding no
103  TCPKeepAlive no
104  AllowAgentForwarding no
105  LogLevel VERBOSE
```

FIRMWARE VERIFICATION

CROSS-REFERENCE TO RELATED APPLICATION

This application claims the benefit of provisional patent application No. 62/713,083 filed Aug. 1, 2018, which is hereby incorporated by reference in its entirety without giving rise to disavowment.

TECHNICAL FIELD

The present disclosure relates to firmware verification in general, and to methods, products and systems for analyzing firmware vulnerabilities and corresponding remedial actions, in particular.

BACKGROUND

Firmware may be low-level software which can directly access hardware. A firmware may be integrated with hardware or may be independently distributed and updated.

The use of firmware may be increasing in scale and importance, and thus firmware validation may be a critical part of system validation. Firmware validation is typically performed manually and tends to be slow and to require extensive resources.

BRIEF SUMMARY

One exemplary embodiment of the disclosed subject matter is a method including: obtaining a list of libraries utilized by a firmware; determining a set of vulnerabilities of the firmware based on a vulnerabilities database, wherein the vulnerabilities database includes known vulnerabilities of libraries, wherein said determining includes identifying in the vulnerabilities database vulnerabilities corresponding to each library of the list of libraries; determining a set of remedial actions for the set of vulnerabilities, wherein each remedial action of the set of remedial actions is associated with at least one of an estimated cost and estimated runtime overhead, wherein the set of remedial actions includes a remedial action that is adapted to remedy at least two vulnerabilities of the firmware, wherein the set of remedial actions includes at least two alternative remedial actions for a vulnerability of the firmware, wherein the set of remedial actions includes an offline remedial action and an online remedial action, wherein the offline remedial action is a remedial action that fixes a first vulnerability in the firmware prior to an execution of the firmware, wherein the online remedial action is a remedial action performed by a runtime component that protects the firmware from an exploitation of a second vulnerability during the execution of the firmware; determining for the set of vulnerabilities a combination of remedial actions of the set of remedial actions, wherein the combination of remedial actions is determined based on estimated costs and estimated runtime overheads of the set of remedial actions; and providing an output based on the combination of remedial actions.

Optionally, the estimated cost is based at least in part on estimated development times of offline remedial actions.

Optionally, said determining the combination of remedial actions is performed based on a limitation on a total development time and based on a limitation on an overall runtime overhead.

Optionally, the offline remedial action includes at least one of an automatic fix of the first vulnerability and a manual fix of the first vulnerability.

Optionally, the offline remedial action includes updating a library of the list of libraries to a different version of the library that is not vulnerable to the vulnerability.

Optionally, the method includes determining that a specific vulnerability of the firmware is not valid according to a predefined condition, wherein said determining the set of vulnerabilities includes omitting the specific vulnerability to provide a valid set of vulnerabilities.

Optionally, said obtaining includes obtaining firmware code and detecting the list of libraries based on the firmware code.

Optionally, the method includes executing the firmware on a computing machine to obtain the firmware code from a memory of the computing machine.

Optionally, said executing the firmware includes querying a runtime system of the firmware to determine the list of libraries.

Optionally, the output includes a plurality of recommendations of remedial actions to be performed, each recommendation including at least one of an estimated cost of the recommendation and estimated runtime overhead for the recommendation.

Optionally, the output includes a recommendation of remedial actions to be performed, wherein, in response to a user acknowledging the recommendation, performing at least a portion of the remedial actions automatically.

Optionally, said providing the output includes: updating the firmware to be immune from a first portion of the set of vulnerabilities; and configuring the runtime component to protect against exploitation of a second portion of the set of vulnerabilities, whereby during execution of the updated firmware together with the configured runtime component, the updated firmware is not susceptible to any vulnerability of the first and second portions of the set of vulnerabilities.

Optionally, said determining the combination includes: defining a set cover problem based on the set of remedial actions and based on the set of vulnerabilities; and automatically solving the set cover problem.

Optionally, said determining the combination includes minimizing an overall estimated cost of the combination.

Optionally, said determining the combination includes minimizing an overall estimated runtime overhead.

Optionally, said minimizing the overall estimated runtime overhead is performed while adhering to a maximal threshold on an overall estimated cost of the combination.

Optionally, said determining the set of vulnerabilities is determined to include vulnerabilities associated with a standard requirement or a certification requirement.

Optionally, the method includes, after said providing, determining a new set of vulnerabilities and corresponding new remedial actions including a first remedial action that fixes a third vulnerability in the firmware prior to the execution of the firmware, and a second remedial action that protects the firmware from the exploitation of the second vulnerability during the execution of the firmware.

Optionally, the method includes providing a work plan configured to certify the firmware, the work plan including an estimated total development time and a set of instructions to be performed manually by a developer for implementing at least one offline remedial action.

Another exemplary embodiment of the disclosed subject matter is a computer program product including a non-transitory computer readable storage medium retaining program instructions, which program instructions when read by a processor, cause the processor to perform a method including: obtaining a list of libraries utilized by a firmware; determining a set of vulnerabilities of the firmware based on a vulnerabilities database, wherein the vulnerabilities database includes known vulnerabilities of libraries, wherein said determining includes identifying in the vulnerabilities database vulnerabilities corresponding to each library of the list of libraries; determining a set of remedial actions for the set of vulnerabilities, wherein each remedial action of the set of remedial actions is associated with at least one of an estimated cost and estimated runtime overhead, wherein the set of remedial actions includes a remedial action that is adapted to remedy at least two vulnerabilities of the firmware, wherein the set of remedial actions includes at least two alternative remedial actions for a vulnerability of the firmware, wherein the set of remedial actions includes an offline remedial action and an online remedial action, wherein the offline remedial action is a remedial action that fixes a first vulnerability in the firmware prior to an execution of the firmware, wherein the online remedial action is a remedial action performed by a runtime component that protects the firmware from an exploitation of a second vulnerability during the execution of the firmware; determining for the set of vulnerabilities a combination of remedial actions of the set of remedial actions, wherein the combination of remedial actions is determined based on estimated costs and estimated runtime overheads of the set of remedial actions; and providing an output based on the combination of remedial actions.

Yet another exemplary embodiment of the disclosed subject matter is a computerized apparatus having a processor, the processor being adapted to perform the steps of: obtaining a list of libraries utilized by a firmware; determining a set of vulnerabilities of the firmware based on a vulnerabilities database, wherein the vulnerabilities database includes known vulnerabilities of libraries, wherein said determining includes identifying in the vulnerabilities database vulnerabilities corresponding to each library of the list of libraries; determining a set of remedial actions for the set of vulnerabilities, wherein each remedial action of the set of remedial actions is associated with at least one of an estimated cost and estimated runtime overhead, wherein the set of remedial actions includes a remedial action that is adapted to remedy at least two vulnerabilities of the firmware, wherein the set of remedial actions includes at least two alternative remedial actions for a vulnerability of the firmware, wherein the set of remedial actions includes an offline remedial action and an online remedial action, wherein the offline remedial action is a remedial action that fixes a first vulnerability in the firmware prior to an execution of the firmware, wherein the online remedial action is a remedial action performed by a runtime component that protects the firmware from an exploitation of a second vulnerability during the execution of the firmware; determining for the set of vulnerabilities a combination of remedial actions of the set of remedial actions, wherein the combination of remedial actions is determined based on estimated costs and estimated runtime overheads of the set of remedial actions; and providing an output based on the combination of remedial actions.

Yet another exemplary embodiment of the disclosed subject matter is a method comprising: obtaining a list of libraries utilized by a firmware; determining a set of vulnerabilities of the firmware based on a vulnerabilities database, wherein the vulnerabilities database comprises known vulnerabilities of libraries, wherein said determining comprises: identifying in the vulnerabilities database vulnerabilities corresponding to each library of the list of libraries, whereby obtaining potential vulnerabilities; determining that a specific vulnerability of the potential vulnerabilities is not valid according to a predefined condition associated with the specific vulnerability; and omitting the specific vulnerability from the potential vulnerabilities to provide the set of vulnerabilities; determining a set of remedial actions for the set of vulnerabilities, wherein the set of remedial actions consists online remedial actions and offline remedial actions, wherein the offline remedial actions are remedial actions that fix one or more vulnerabilities in the firmware prior to an execution of the firmware, by updating program instructions or configuration files of the firmware, wherein each offline remedial action is associated with an estimated development time, wherein the online remedial actions are remedial actions performed by a runtime component that protects the firmware from exploitations of one or more vulnerabilities during the execution of the firmware, wherein each online remedial action is associated with an estimated runtime overhead, wherein the set of remedial actions comprises at least one remedial action that is adapted to remedy at least two vulnerabilities of the firmware, wherein the set of remedial actions comprises at least two alternative remedial actions for a vulnerability of the firmware; determining for the set of vulnerabilities a combination of remedial actions of the set of remedial actions, wherein the combination of remedial actions is determined based on a limitation on a total development time of applying all offline remedial actions in the combination of remedial actions, wherein the combination of remedial actions is determined based on a limitation on a total runtime overhead of applying all online remedial actions in the combination of remedial actions; and providing a user with a list of the offline remedial actions in the combination of remedial actions, wherein at least one offline remedial action can be applied automatically, whereby the user is enabled to update, manually or automatically, the firmware to be immune from a first portion of the set of vulnerabilities; and configuring the runtime component to protect against exploitation of a second portion of the set of vulnerabilities; whereby during execution of the updated firmware together with the configured runtime component, the updated firmware is not susceptible to any vulnerability of the first and second portions of the set of vulnerabilities.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 9 shows a screenshot of an exemplary report, in accordance with some exemplary embodiments of the disclosed subject matter;

FIG. 10 shows a screenshot of a security requirements report, in accordance with some exemplary embodiments of the disclosed subject matter;

FIG. 11 shows a screenshot of exemplary remedial actions suggested for a security requirement, in accordance with some exemplary embodiments of the disclosed subject matter; and FIG. 12 shows a screenshot of an exemplary automatic fix of a security requirement, in accordance with some exemplary embodiments of the disclosed subject matter.

DETAILED DESCRIPTION

Figure 1:
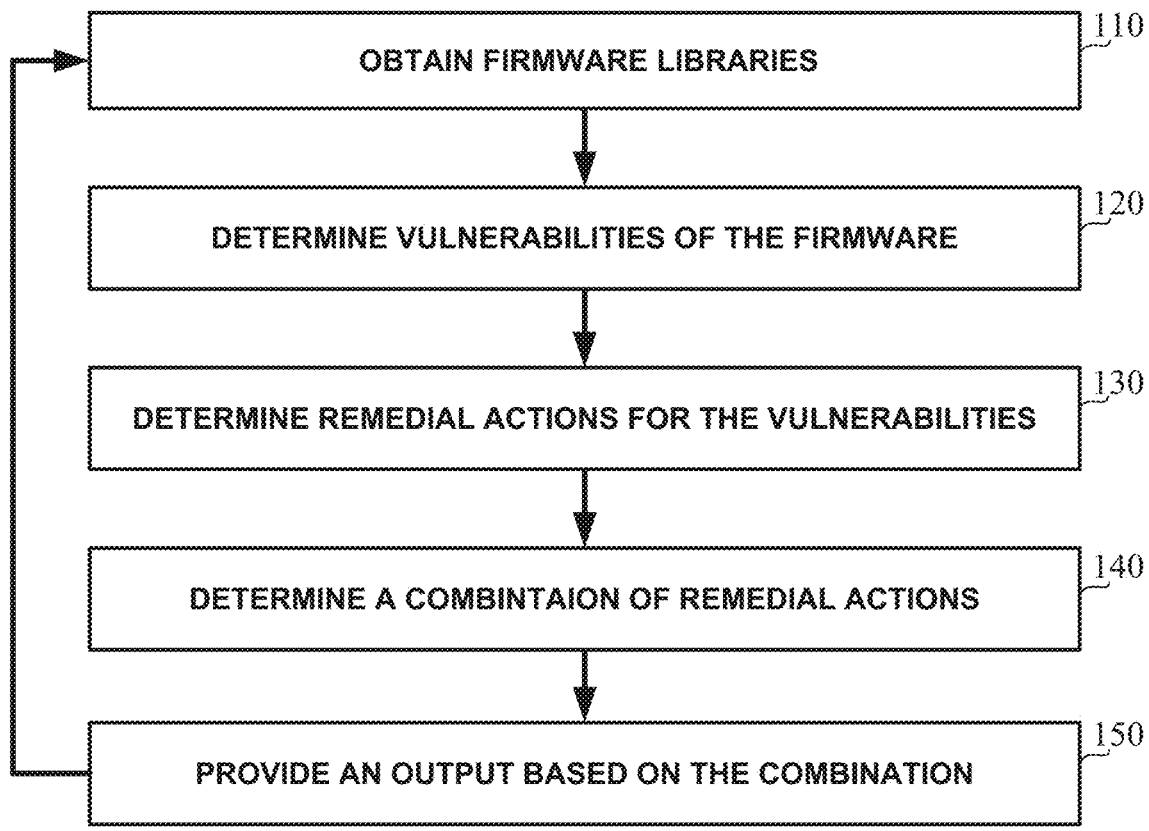
FIG. 1 shows a flowchart of a method, in accordance with some exemplary embodiments of the disclosed subject matter.

One technical problem dealt with by the disclosed subject matter is verifying that a firmware provides or performs functions according to a requirement, e.g., a certification or a security requirement. Additionally or alternatively, it may be desired to verify that the firmware is not subject to vulnerabilities. In some cases, certification bodies may wish to determine whether firmware products comply with certification or validation requirements. Additionally or alternatively, it may be desired to verify that the firmware complies with security requirements and is not subject to security breaches. In some cases, it may be desired to determine what remedial actions can be performed to certify the firmware products, e.g., if such remedial actions exist. For example, certification bodies may require a firmware device to have certain functionalities and to undergo tests to ensure that the functionalities work as expected.

In some exemplary embodiments, a vulnerability of a firmware may include a weakness of the firmware that may be exploited by a threat actor, such as an attacker or a malicious user, to perform unauthorized actions within a computer system. A potential vulnerability may include, for example, a test that can be performed to check whether the firmware functions properly, whether the firmware may be exploited by the attacker using the potential vulnerability, or the like. In some exemplary embodiments, a security-related vulnerability may also be referred to as a security breach.

Another technical problem dealt with by the disclosed subject matter may be finding vulnerabilities of a firmware, for example, automatically. In some cases, it may be difficult to identify vulnerabilities of a firmware. Exhaustively going through all possible vulnerabilities and determining whether they may be valid for the firmware may require extensive efforts and resources. In some cases, users may not have full or even partial access to a firmware's code, such as in source code form or even in binary form. Such limited access to the code may increase a difficulty of finding the vulnerabilities of the firmware.

Another technical problem dealt with by the disclosed subject matter may be providing an automatic assistance to developers by determining relevant vulnerabilities. In some cases, it may be desired to provide an automated assistance relating on how to deal with the vulnerabilities, such as based on estimated costs, an estimated timeframe, required resources, or the like. This may require evaluating vulnerabilities of a firmware correctly for importance. For example, it may be required to determine which vulnerabilities are ranked low in an important scale or are determined to be irrelevant such that they may be ignored. As another example, a sequence of remedial actions to be performed may be required. In some cases, there may be different potential remedial actions that can be performed, such as applying a known fix, fixing the firmware, runtime patching the firmware, applying a dynamic protecting agent, or the like.

Yet another technical problem dealt with by the disclosed subject matter may be enhancing firmware testing to require fewer resources.

One technical solution may include a certification scheme which may be configured to certify a firmware. The firmware may be independent or may be integrated with a device such as an Internet of Things (IoT) device, a user device, or the like. In some exemplary embodiments, the certification scheme may automatically determine threats that are applicable to the firmware or to its device. In some exemplary embodiments, the certification scheme may include a static analysis of the code of the firmware (e.g., in source code form, in binary form, or the like), analysis of the environment of the firmware, analysis of the device of the firmware, or the like. In some exemplary embodiments, based on the static analysis of the code, vulnerabilities of the firmware may be determined according to known vulnerabilities of libraries, of firmware having common components, capabilities, usage of specific instructions or patterns of instructions (e.g., scanf instruction; bug pattern such as disclosed in E. Frachi et al., "Concurrent Bug Patterns and How to Test Them", Proceedings International Parallel and Distributed Processing Symposium, April 2003, which is hereby incorporated by reference in its entirety for all purposes without giving rise to disavowment), or the like. In some exemplary embodiments, based on the vulnerabilities of the firmware, one or more suggestions of remedial actions may be determined and provided to a user, e.g., as described herein.

In some exemplary embodiments, the certification scheme may include obtaining a list of libraries utilized by a firmware. In some exemplary embodiments, the list of libraries may be obtained even when a code of the firmware is unavailable, difficult to obtain, or the like, for example, by running and executing the firmware itself on a computing machine. During execution, the firmware's code and configuration data may be at least partially loaded to a memory of the computing machine such that after execution, the firmware's code and configuration data may be extracted and analyzed to determine the list of libraries utilized by the firmware.

In some exemplary embodiments, the certification scheme may include determining a set of vulnerabilities of the firmware based on a vulnerabilities database, e.g., by identifying in the vulnerabilities database vulnerabilities corresponding to each library of the list of libraries. In some exemplary embodiments, the vulnerabilities database may include known vulnerabilities of libraries, e.g., as described herein.

In some exemplary embodiments, the certification scheme may include obtaining a full list of vulnerabilities based on the vulnerabilities database. Relevant vulnerabilities from the full list may be detected by analyzing one or more conditions of each vulnerability to determine if the vulnerability is valid for the firmware. If the condition holds, one or more parameters of the condition may be evaluated, inspected, or the like to determine if they hold as well. If the one or more parameters hold, it may be determined that the vulnerability is valid for the firmware.

In some exemplary embodiments, the set of vulnerabilities of the firmware may be selected by a user to be protected. For example, the certification scheme may include presenting to the user relevant vulnerabilities, and the user may select the set of vulnerabilities that he wishes to deal with. In some cases, the user may indicate he wishes to ignore one or more vulnerabilities from the relevant vulnerabilities. In some exemplary embodiments, the user may indicate that the vulnerability is relevant and is to be ignored nonetheless. Additionally or alternatively, the user may consider the detected vulnerability as a "false positive", which is determined to exist but in actuality the firmware is not susceptible to the vulnerability, such as may be the case of a vulnerability detected using static analysis means.

In some exemplary embodiments, the certification scheme may include determining a set of remedial actions for the set of vulnerabilities. In some exemplary embodiments, each remedial action of the set of remedial actions may be associated with an estimated cost, estimated runtime overhead, or the like, e.g., as described herein.

In some exemplary embodiments, the set of remedial actions may include an offline remedial action and an online remedial action. In some cases, the offline remedial action is a remedial action that fixes a first vulnerability in the firmware prior to an execution of the firmware. In some cases, the online remedial action may be a remedial action performed by a runtime component (also referred to as "software agent", "agent", or "online component") that may protect the firmware from an exploitation of a second vulnerability during the execution of the firmware, e.g., as described herein.

In some cases, if a vulnerability is removed from the firmware, for example, after implementing an offline remedial action, the software agent may be updated to provide a reduced functionality without increasing the risk of an exploitation of the vulnerability. In some exemplary embodiments, the runtime component may be specifically tailored to protect the firmware against exploitation of the vulnerabilities that were not fixed in an offline manner.

In some exemplary embodiments, the set of remedial actions may include a remedial action that is adapted to remedy at least two vulnerabilities of the firmware. In some exemplary embodiments, the set of remedial actions may include at least two alternative remedial actions for a vulnerability of the firmware, e.g., as described herein.

In some exemplary embodiments, the certification scheme may include determining a combination of remedial actions of the set of remedial actions for the set of vulnerabilities, e.g., based on estimated costs and estimated runtime overheads of the set of remedial actions, e.g., as described herein.

In some exemplary embodiments, an output based on the combination of remedial actions may be provided to a user, e.g., as described herein.

In some exemplary embodiments, the certification scheme may be implemented in an iterative process, e.g., until no more user-selected vulnerabilities are detected. An initial cycle or iteration may be insufficient, and may be refined following new iterations and tests. Each cycle may include finding whether there are any new vulnerabilities that are not intended to be protected by an agent and were not determined to be ignored by the user. If new vulnerabilities are found, the cycle may continue with determining whether to ignore some vulnerabilities, and determining remedial actions such as runtime patching and fixing for the remaining new vulnerabilities, e.g., according to a determined order or sequence, to provide an updated firmware. An iteration may end with a testing stage, which may include testing the firmware together with the runtime component, testing whether the fixed vulnerabilities are indeed fixed, and testing any other vulnerability determined with the static analysis. In some cases, the testing stage may include tests of vulnerabilities that were determined to be irrelevant. However, the focus and majority of testing may test vulnerabilities that are determined to be relevant. In some exemplary embodiments, relevant vulnerabilities that were selected by the user to be ignored, may not be tested. Additionally or alternatively, if there are sufficient resources to invest in such testing, false positive vulnerabilities may be tested for, and if detected, the user may be informed that the vulnerability is not a false positive vulnerability. In some cases, prioritization of false positive vulnerabilities to be tested may be performed based on their respective severities or estimated severities. Additionally or alternatively, testing for false positive vulnerabilities may be a side effect of other tests employed by the disclosed subject matter.

In some exemplary embodiments, firmware may be required to be compliant with one or more standards. To determine whether firmware complies with the one or more standards, its vulnerabilities and components may be mapped to different requirements of standards, e.g., simultaneously. In some exemplary embodiments, standards' requirements which may be extracted from official standard documents, may be compared to a validation state of the firmware, for example, including remaining vulnerabilities of the firmware, to determine compliance to the standard. In some exemplary embodiments, compliance to a standard may be determined based on remaining vulnerabilities of the firmware, libraries utilized by the firmware, or the like.

One technical effect of the disclosed subject matter is improving resource utilization of a computerized framework by automatically detecting relevant vulnerabilities of an inspected firmware and providing to the user one or more efficient suggestions of remedial actions to protect the firmware from exploitation of the detected vulnerabilities, while ignoring irrelevant vulnerabilities. Additionally, focusing testing on relevant vulnerabilities may enhance the certification process and decreases a computational cost.

Another technical effect of the disclosed subject matter may be that during execution of an updated firmware, e.g., together with a configured runtime component, the updated firmware may not be susceptible to previously identified vulnerabilities. Some vulnerabilities may be protected against exploitation by using the runtime component whereas other vulnerabilities may be protected against exploitation due to offline remedial actions that ensure that the updated firmware is not susceptible to exploitations of the vulnerabilities.

Yet another technical effect of the disclosed subject matter may be providing a work plan including a list of additional steps, for example, while taking into account user limits and costs. In some cases, the work plan may be relatively efficient in terms of costs, such as development time, runtime overhead, or the like. Additionally or alternatively, the work plan may comprise accurate suggestions, ignoring vulnerabilities that are covered by online remedial actions, and avoiding investing development time in fixing them in an offline manner.

Yet another technical effect of the disclosed subject matter may be providing a software agent, e.g., configured to patch vulnerabilities automatically, being memory efficient, power efficient, computationally efficient, or the like. The software agent may be a runtime component that is specifically tailored—either via configuration or by being custom-generated—to protect the firmware against exploitation of the vulnerabilities that were not fixed in an offline manner. In some cases, if a vulnerability is removed from the firmware, the software agent may be updated to provide a reduced functionality, so as to reduce the runtime overhead, without increasing the risk of an exploitation of the vulnerability.

Yet another technical effect of the disclosed subject matter may be focusing and enhancing an accuracy of vulnerability testing, such as during firmware certification. In some exemplary embodiments, an amount of vulnerability tests and attacks may be reduced by focusing a testing procedure on vulnerabilities that fulfill their conditions, fulfill their parameters, which are selected by the user to be fixed, that are not being protected by a software agent, or the like. This may be time efficient and computationally efficient. In some exemplary embodiments, due to such reduction, scalability of certification processes may be achieved. In some exemplary embodiments, relevant tests may be automatically detected based on the vulnerabilities of the firmware. This may enhance an effectiveness of the testing procedure.

Yet another technical effect of the disclosed subject matter may be enabling detection of firmware libraries and vulnerabilities even when a source code of the firmware is unavailable or difficult to obtain.

Yet another technical effect of the disclosed subject matter may be automatically determining whether firmware complies with one or more standards. Additionally or alternatively, the determination may be performed simultaneously for a plurality of standards.

Yet another technical effect of utilizing the disclosed subject matter is to enhance the report of vulnerabilities to clients, and make it more particular and efficient. In some exemplary embodiments, attacks may be checked statically, dynamically, manually, automatically, or the like. Based on the analysis of driver, hardware, libraries, or the like, a subset of vulnerabilities that may be relevant to such component may be determined. The subset of the vulnerabilities may be tested in a focused manner. This may save time and improve resource utilization of a computerized framework.

Yet another effect is providing an improved report to users. As only relevant vulnerabilities are examined, the report is more meaningful and includes less false positive results. For example, in case there is no web server capability, a vulnerability of "web server not working" is senseless, while the same is meaningful where the web server should be available but does not respond.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, a list of one or more libraries utilized by the firmware may be obtained. The list of libraries may be determined automatically based on the firmware's code, extracted from a development environment, provided manually, or the like. In some exemplary embodiments, libraries may be detected based on firmware binary or source code. In some exemplary embodiments, a list of libraries may be detected based on various other sources of information, e.g., an automatic dumper, for example, as described herein.

Additionally or alternatively, a list of one or more capabilities of the firmware may be determined. The list may include functional capabilities of the firmware or any other capabilities. In some exemplary embodiments, capabilities of the firmware may comprise communication protocols that the firmware utilizes (e.g., Bluetooth protocol, TCP/IP, SIP, HTTP, Wi-Fi 802.11b/g/n, or the like), methods utilized by the firmware to read/write from storage, sensors that the firmware activates or utilizes, or the like.

In some exemplary embodiments, a library of the firmware may be evaluated. In some exemplary embodiments, each library may correspond to a set of vulnerabilities. In some exemplary embodiments, a capability of the firmware may be evaluated. In some exemplary embodiments, each capability may correspond to a set of vulnerabilities. The set of vulnerabilities may be determined based on a database, such as a vulnerabilities database, which may include known vulnerabilities of a plurality of libraries, capabilities, or the like. For example, a capability or library of the firmware may be compared to entries of the vulnerabilities database, and vulnerabilities may be obtained from every entry the vulnerabilities database which corresponds to the capability or library of the firmware.

In some exemplary embodiments, a library may include a collection of non-volatile resources, which may be utilized by firmware, such as configuration data, documentation, help data, message templates, pre-written code and subroutines, classes, values or type specifications, or the like. Additionally or alternatively, a library may be a collection of implementations of behavior, written in terms of a language that has a well-defined interface by which the behavior is invoked. In some exemplary embodiments, for each library, additional information may be retained, such as capabilities associated with the library, alternative libraries that provide the same or similar functionality, a license under which the library is distributed, or the like.

In some exemplary embodiments, firmware information such as libraries utilized by the firmware may be obtained even when a code of the firmware is unavailable, when the code is difficult to obtain, when it is difficult to analyze the code, or the like. This may be the case for various reasons, e.g., when the firmware is provided without access to its code. In some cases, the firmware may be installed on an IoT device, and its binary code, without debugging information, may be the only thing available for analysis. In some cases, even such binary code may be hard to retrieve due to limitations of the functionality of the IoT, and a potential lack of terminal access to the IoT device.

In some exemplary embodiments, an automatic dumper, also referred to as autodumper, may be utilized to obtain firmware information. The autodumper may be a software product that when executed obtains firmware information, such as information about libraries utilized by the firmware, environmental information related to the firmware, or the like. As an example, the autodumper may be utilized when a source code of the firmware is unavailable, when the source code is difficult to obtain, when it is difficult to analyze the code, or the like. In some exemplary embodiments, even when the source code of the firmware is unavailable or difficult to obtain, it may still be possible to run and execute the firmware itself on a computing machine. During execution, the firmware's code and configuration data may be at least partially loaded to the memory of the computing machine. In some cases, the information retained in pages of the memory may also be stored in the storage device. The storage of the computing machine may contain a portion, e.g., most, of the firmware's code by the end on the execution. After the execution of the firmware on the computing machine, the code of the firmware may be obtained from the memory of the computing machine. The code and execution information of the firmware may be detected in the storage of the computing machine and extracted to be analyzed and evaluated, e.g., to determine the firmware's libraries, capabilities, additional information, or the like.

In some exemplary embodiments, the autodumper may be activated after the computing machine is active for a period of time, e.g., a predefined or minimal period of time. This may enable to more easily differentiate system scripts and libraries from the firmware's scripts and libraries.

In one example, a user, e.g., a salesperson, may desire to certificate an IoT device which he owns. However, he may not possess the IoT device's source code. Accordingly, he may run the firmware on a computing machine, for example, after the computing machine is active for more than a predetermined time period, and use the autodumper to back up a storage of the computing machine, e.g., a disk-on-key or on any other storage device. The backed-up storage may be inspected and analyzed instead of the source code, to determine the IoT device's libraries, capabilities, or the like.

Additionally or alternatively, information about firmware libraries, capabilities, or the like may be obtained directly from an execution environment, for example, when a source code of the firmware is unavailable. For example, the information may be obtained by querying a runtime system of the firmware during execution of the firmware on a computing machine. In some exemplary embodiments, during execution of the firmware on the computing machine, a netstat command may provide communication protocol information utilized by the firmware. In some cases, a list of libraries and their versions may be derived from the communication protocol information.

In some exemplary embodiments, the firmware may be analyzed during execution to determine additional information which may be difficult to obtain otherwise. In some cases, the additional information may include information about the firmware, its housing device, its execution environment, or the like. As an example, it may be difficult to identify using static analysis which ports are being used by the firmware. However, during execution, such information may be determined with relative ease by analyzing the execution environment and detecting open ports.

In some exemplary embodiments, querying the runtime system may include running commands during the execution of the firmware, e.g., to receive the additional information. As an example, the runtime system may be queried to detect which processes are running on the computing machine. As another example, a netstat command may be executed to find which ports are being used by a device housing the firmware and by the firmware. For example, commands for querying the runtime system may include the following:

uname -a: find system information such as the machine's hostname, the processor's architecture, and a name/version of the operating system and kernel;
/prox/devices/prox/mdd: find storage devices;
mount: find which devices are mounted;
df: find total and used up memory of each device;
ps: find which processes/services are running;
IfConfig: find network definitions;
LSmode: find which drivers are loaded and running'
DMessage: log kernel messages;
ls -R: display all file system structure;
fdisk: find information about storage.

It is noted that the above commands are examples only, and are related to any UNIX™-like system, such as LINUX™ operating system. Equivalent, additional or alternative commands may be available in other systems.

In some exemplary embodiments, querying the runtime system, e.g., by running commands, may be performed automatically, manually by a user, or the like.

In some exemplary embodiments, it may be desirable to obtain version numbers of libraries used by the firmware. This may be implemented by running an emulation with a command, for example, a -v command, which is configured to find a version of a library. This may enable a user to find accurate library versions, which may be a difficult task otherwise. In other cases, version numbers of libraries may be obtained, for example, at least partially, using static analysis. For example, a firmware may utilize a library of version 1.2.3, but a static analysis may provide a partial version number of the library, e.g., version 1.2, without the exact PATCH number, which may enable a general classification of the library.

In some exemplary embodiments, information about an inspected firmware device, e.g., the additional information or backed up storage, may include sensitive information. It may be desirable to secure communications of such information between users such as between a certification body and owners or users of the firmware device, e.g., using encryption. In one example, a user may desire to send a device with firmware for inspection without risking data leakage. The user may therefore encrypt the firmware, e.g., directly on the device, before sending it to be verified, for example, using the autodumper which may reduce a security risk.

In some exemplary embodiments, it may be possible to validate, for example, at least partially, a firmware of a device based on scanning the device alone. This may be utilized, for example, when the device itself is not available. For example, it may be possible to determine what ports the device has based on the scan, and determine what fuzz testing is needed to test a firewall, for example, based on the ports of the device. In some exemplary embodiments, fuzz testing may be parameterized, enabling it to select the actual ports to test, based on the provided parameters, so as to focus the testing on ports that could be relevant for the firmware.

On Step 120, a set of vulnerabilities of the firmware may be determined based on the vulnerabilities database, e.g., by identifying in the vulnerabilities database vulnerabilities corresponding to each library of the list of libraries. Specifically, vulnerabilities corresponding to a library that is utilized by the firmware, may be identified in the vulnerabilities database. Accordingly, a set of vulnerabilities of the firmware may be determined. In some exemplary embodiments, the vulnerabilities database may include known vulnerabilities of libraries.

In some exemplary embodiments, the vulnerabilities database may retain entries. In some exemplary embodiments, each entry may list one or more potential vulnerabilities. A potential vulnerability may include, for example, a test that can be performed to check whether the firmware functions properly. In some exemplary embodiments, the entries may represent libraries, capabilities, or combination thereof. In some exemplary embodiments, entries in the vulnerabilities database may represent libraries that may be used by firmware.

Additionally or alternatively, entries in the vulnerabilities database may represent vulnerabilities of different capabilities that may exist in firmware. In some exemplary embodiments, potential vulnerabilities of each capability may be listed. For example, a firmware that implements the TCP/IP protocol may be susceptible to different attack vectors that are based on the details of such protocols. Similarly, a firmware that employs a certain sensor, may be susceptible to attacks based thereon. In some exemplary embodiments, the entries may list potential vulnerabilities and optionally a test to examine whether the vulnerability exists in the firmware.

Additionally or alternatively, vulnerabilities of a firmware may be obtained directly from a firmware's code, such as by analyzing the code. In other cases, vulnerabilities of a firmware may be obtained indirectly, such as by executing the firmware, by analyzing documentation of the firmware, by querying a runtime environment of the firmware, or the like.

In some exemplary embodiments, the vulnerabilities database may retain for each library or capability, tests or attacks, which may be executed manually or automatically to determine whether or not the firmware is subject to the potential vulnerability. In some exemplary embodiments, if the firmware is not subject to the potential vulnerability, the firmware may exhibit correct functionality, when the vulnerability is being exploited.

As an example, vulnerabilities of a firmware may include Common Vulnerabilities and Exposures (CVE) vulnerabilities that may be defined in a CVE system. In other exemplary embodiments, the firmware may have any other type of vulnerabilities.

In some exemplary embodiments, vulnerabilities may be evaluated to determine whether they are valid or not for the firmware, e.g., as described herein.

In some exemplary embodiments, when using an auto-dumper, executables may be analyzed statistically to determine which executables are suspected to be vulnerable to attacks. These executables may be tested by fuzz testing, attack simulation, or the like. This may be achieved by running the emulation on the executables, e.g., dynamically. In some exemplary embodiments, a fuzz testing may be performed automatically on the relevant executables, e.g., after determining the relevant executables with the emulation. In some exemplary embodiments, fuzz testing may be library specific, execution specific, or the like.

In some exemplary embodiments, a vulnerability may have one or more conditions, which must be fulfilled to discover that the vulnerability is valid. For example, if a condition of vulnerability is not fulfilled, the vulnerability may be determined to be invalid for the firmware, and may be ignored or omitted from a set of vulnerabilities that are further evaluated for certification of the firmware.

In some exemplary embodiments, a valid vulnerability of a firmware may refer to a weakness of the firmware that may be exploited by a threat actor, such as an attacker, a malicious user, or the like.

In one example, a firmware may include a plurality of libraries, e.g., fourteen libraries. A library of the plurality of libraries, e.g., library number five, may have a known vulnerability, e.g., which may be defined as CVE-2019-12308 in the CVE system. According to this example, CVE-2019-12308 may have a condition to determine whether it is invalid. If the condition is not met then CVE-2019-12308 may be ignored and omitted from the certification scheme, for example, since it may be irrelevant for validation of the firmware.

In some exemplary embodiments, a condition may relate to an operating system version or type, peripheral devices, hardware components, library versions, platforms, or any other property of the firmware, its environment, its housing device, or the like. As an example, based on a condition, a vulnerability of a firmware may be valid only on a Linux™ operating system. According to this example, if the firmware is not running on the Linux™ operating system, the condition may be considered to not be held and the vulnerability may be ignored and omitted from the certification scheme of the firmware.

In some exemplary embodiments, a condition of a vulnerability may be necessary but not sufficient for determining that the vulnerability is valid for the firmware. In some exemplary embodiments, conditions may have one or more parameters. If the condition holds, the one or more parameters may be evaluated, inspected, or the like to determine if they hold as well. If the one or more parameters hold, it may be determined that the vulnerability is valid for the firmware. For example, the one or more parameters may include a socket being used, port numbers, or any other related information.

As an example, a condition of a vulnerability may include a version of a firewall, e.g., version 4.2. The condition may have a parameter indicating a use of port number 38. To determine whether the vulnerability is valid, it may be required to determine whether the condition, when applied to the parameter, is valid such that firewall of version 4.2 is monitoring port number 38.

In some exemplary embodiments, a condition of a vulnerability may not have any parameters. In some exemplary embodiments, in case there are no parameters, the condition may be sufficient for determining whether the vulnerability is valid. In that case, if the condition holds, the vulnerability may be immediately determined to be valid for the firmware.

In some exemplary embodiments, a vulnerability, e.g., each vulnerability of a firmware, may have a set of one or more potential attacks. In some exemplary embodiments, an attack database may comprise a set of attacks, tests, or the like, that may be utilized to exploit a vulnerability. For example, the CVE system may include a description of at least one known attack that may be used against a certain CVE. Additionally or alternatively, the CVE system may comprise a script for executing the known attack against the certain CVE.

In some exemplary embodiments, a set of one or more known attacks or tests may be organized in the attack database. The attack database may be located in the CVE system, in a server, in the firmware's device, or in any other location.

Figure 2:
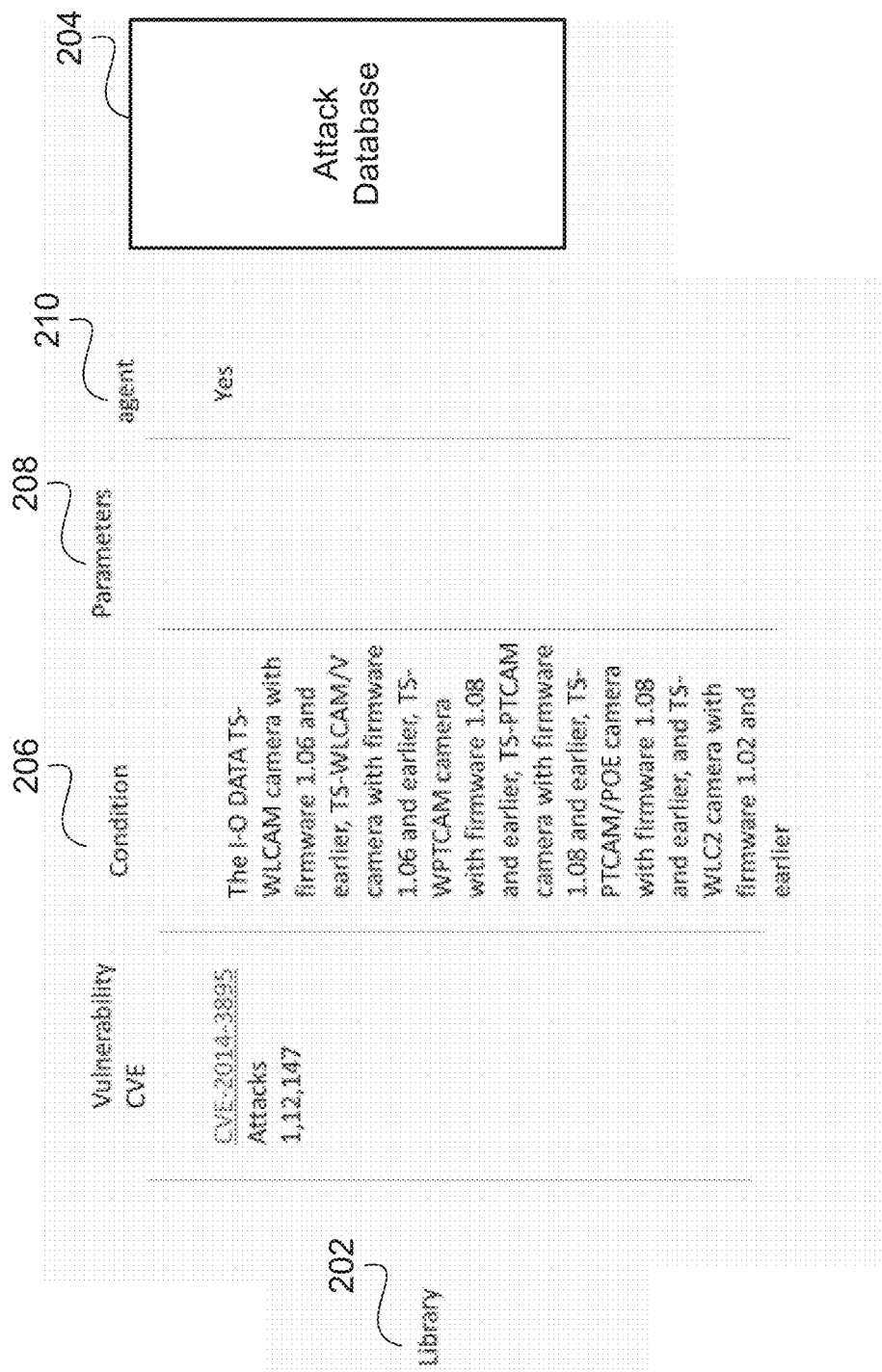
FIG. 2 shows an illustration of an entry relating to a vulnerability, in accordance with some exemplary embodiments of the disclosed subject matter.

Referring now to FIG. 2 showing an illustration of an entry relating a vulnerability of a firmware, in accordance with some exemplary embodiments of the disclosed subject matter.

As shown in FIG. 2, a Library 202 of a firmware has a known vulnerability (denoted "CVE-2014-3895"), which may be vulnerable to attacks number 1, 12, and 147 from Attack Database 204. CVE-2014-3895 has a Condition 206, which may be determined to be valid or invalid. Condition 206 may or may not have Parameters 208. As shown in FIG. 2, Parameters 208 is empty for CVE-2014-3895. Since Condition 206 has no Parameters 208, in order to determine whether or not CVE-2014-3895 is valid for the firmware, Condition 206 may be evaluated regardless of specific parameters. In the illustrated example of FIG. 2, Condition 206 relates to the specific model and firmware of a camera utilized by Library 202.

In some exemplary embodiments, a possible remedial action to prevent the vulnerability from being exploited may be to fix the vulnerability in Library 202, to change a configuration related to Condition 206 or Parameter 208, or the like. In some cases, the remedial action may be to execute a software agent to perform online remedial action. As shown in FIG. 2, Agent 210 is executed as a remedial action for CVE-2014-3895.

Referring back to FIG. 1, a set of determined vulnerabilities of the firmware may be provided to the user. In some exemplary embodiments, the set of vulnerabilities may be displayed to the user, sent to the user, or the like. In some exemplary embodiments, the set of determined vulnerabilities may be provided together with additional information relating thereto, such as but not limited to an estimated importance rate for each vulnerability, warnings, estimated fixing costs, estimated resources utilization by the agent, an estimated timeframe to fix the vulnerabilities, or the like.

In some exemplary embodiments, the user may determine or select which vulnerabilities from the set of determined vulnerabilities he wishes to protect, and in what manner. A set of selected vulnerabilities may be received from the user, and a protection plan for the set of selected vulnerabilities may be determined. Additionally or alternatively, the set of selected vulnerabilities may be selected automatically based on requirements of a certain certification process, which may require a subset of vulnerabilities to be handled. In some exemplary embodiments, the protection plan may only apply to the selected vulnerabilities. For example, the protection plan may be configured to test potential attacks on the vulnerabilities automatically or manually while ignoring the unselected vulnerabilities. In some exemplary embodiments, an attack determined to pose a real threat via the selected vulnerabilities may cause an alert to appear for a user.

In some exemplary embodiments, ignoring or minimizing testing of potential attacks on unselected vulnerabilities may be time and cost efficient compared to testing the entire attack database in an unfocused manner. In some cases, ignoring such attacks may reduce required time, e.g., execution and development time, reduce memory usage, enhance a functionality of the tests, reduce computation power, or the like. In some cases, checking the entire attack database may not be feasible or commercially viable.

On Step 130, a set of remedial actions may be determined for the set of vulnerabilities. In some exemplary embodiments, each remedial action of the set of remedial actions may be associated with an estimated cost, estimated runtime overhead, or the like, e.g., as described herein.

In some exemplary embodiments, one or more remedial actions may be automatically suggested for the selected vulnerabilities. The suggestion may be provided to a user, who may accept the suggestion, modify it, or reject it. In some exemplary embodiments, the set of remedial actions may include offline remedial actions, online remedial actions, a combination thereof, or the like. An offline remedial action may be a static remedial action that is configured to fix vulnerabilities in the firmware prior to an execution of the firmware, such as by updating the library code, runtime patching the code of the firmware, debugging the firmware, or the like. Additionally or alternatively, an online remedial action may comprise a dynamic remedial action that is configured to be performed by a runtime component (also referred to as "software agent", "agent", or "online component") to protect the firmware from an exploitation of vulnerabilities during the execution of the firmware. The runtime component may be an embedded runtime component, a software product that is embedded in the firmware, a software product separated from the firmware and executed together therewith on the same device, or the like.

In some exemplary embodiments, when an online remedial action is available, the runtime component may be selected for protecting the firmware from exploitation of one or more vulnerabilities. In other embodiments, there may not be any online remedial action available. Additionally or alternatively, the online remedial action may not be selected, such as based on a user decision, based on an automated selection in view of an overall execution overhead, or the like.

In some exemplary embodiments, the runtime component may be located at a computing machine and may be configured to protect the firmware from exploitation of one or more vulnerabilities during an execution of the firmware on the computing machine.

In some exemplary embodiments, the runtime component may be configured to independently protect the firmware from known or unknown threats. The runtime component may deploy a mask over inputs, prevent a scenario from occurring, or the like. The runtime component may adversely affect the firmware, such as by limiting its functionality. For example, the runtime component may protect against an exploit that is related to a camera, by blocking communication from the camera altogether. Additionally or alternatively, the runtime component may analyze the input provided by the camera and block only input that is related to the vulnerability it protects against. In some exemplary embodiments, the runtime component may be configured to protect against a certain attack, or may be configured to dynamically detect attacks and prevent them.

In some exemplary embodiments, the runtime component may be generated so as to address a specific set of vulnerabilities and protect against a specific set of attacks that may be used for exploitation of the specific set of vulnerabilities. In some exemplary embodiments, any newly detected attack that may be used to exploit the specific set of vulnerabilities, may cause the runtime component to be modified so as to address the newly detected attack. In some cases, if the newly detected attack requires an additional protection capability. In some exemplary embodiments, the additional protection capability may be obtained automatically by the runtime component, such as by downloading the capability from a server, device, or the like. Additionally or alternatively, the additional protection capability may be introduced manually, such as by a developer, a programmer, or the like. Additionally or alternatively, the runtime component may be a generic runtime component that has a plurality of protection capabilities, and may be configured, using a configuration file, or based on commands provided thereto, to activate a subset of the protection capabilities that are related to the specific set of vulnerabilities. In some exemplary embodiments, by providing a subset of the protection capabilities—be it by a generated specifically-tailored runtime component, or by configuring a generic runtime component—the runtime overhead of the runtime component may be controlled and limited.

In some exemplary embodiments, if the remedial action for a specific vulnerability is performed using a runtime component, the firmware may not be tested for exploitation of the specific vulnerability. For example, no attacks, predetermined tests, fuzz testing or the like may be run for the specific vulnerability, as the firmware may be viewed as being protected against exploitation of the vulnerability thanks to the runtime component, even if the firmware, when executed without the runtime component, is subject to such vulnerability.

In some exemplary embodiments, an offline remedial action may include an automatic fix or a manual fix of a vulnerability. In some exemplary embodiments, an offline remedial action for a vulnerability may include changing automatically a code, a library, or a similar component of the firmware to eliminate the vulnerability. As an example, the offline remedial action may include updating the version of the library to a different version. In some exemplary embodiments, an offline remedial action may comprise a developer manually fixing the vulnerability. Additionally or alternatively, the disclosed subject matter may provide a development guidance as to how to fix the vulnerability.

In some exemplary embodiments, a manual or automatic fix of a firmware may include changing source code of the firmware. As an example, a gets( ) function may be changed to a fgets( ) function in the C language, thereby solving at least one potential vulnerability. At some cases, a modified code may have new vulnerabilities associated with it.

In some exemplary embodiments, a fix of a firmware may include changing a library version utilized by the firmware. Such an update may fix a security breach and eliminate a vulnerability. For example, changing a library from version 1.1.7 to version 1.1.9 may solve at least one problem. At some cases, a new library version may have new vulnerabilities associated with it. In some exemplary embodiments, the library may have a version which comprises a MAJOR version, a MINOR version and a PATCH version, in a format such as MAJOR.MINOR.PATCH. In some exemplary embodiments, a library update that includes a change in PATCH version only may be preferable as it is less likely to introduce new vulnerabilities. In some exemplary embodiments, MAJOR and MINOR version updates may indicate the inclusion of additional functionality, which may also be associated with additional vulnerabilities. Additionally or alternatively, a library that includes a change in the MINOR version but not in the MAJOR version may be preferable over versions that update the MAJOR version, as the MAJOR version may indicate backward-incompatibility, which may require development time to overcome. Additionally or alternatively, the library may be replaced by an alternative library providing similar functionality but potentially not being susceptible to the same vulnerability. In some exemplary embodiments, changing a library of the firmware may be more time and cost efficient at least compared to fixing the original library. In some exemplary embodiments, an automatic fix may be considered as having zero cost, as it may be performed automatically without requiring any development time.

In some exemplary embodiments, a fix may be defined as "positive" if it fixes at least one vulnerability without causing any new vulnerabilities to occur. Alternatively, a fix may be defined as "negative" if it fixes at least one vulnerability but causes new problems and vulnerabilities to emerge in the firmware. In some exemplary embodiments, a "positive" fix may be scored higher in an importance rate than a "negative" fix, e.g., since "negative" fixes may require additional iterations. In some cases, a "negative" fix, such as updating a MAJOR version of a library, may be preferred albite the additional iterations, due to advantages of such a fix.

For example, changing a library from version 1.1.7 to version 1.1.9 may fix problems emerging from version 1.1.7 without creating any new problems. Alternatively, changing a library from version 1.1.7 to version 2.1.4 may fix some problems emerging from version 1.1.7 but create other problems. According to this example, a user may receive a list of possible remedial action including changing version 1.1.7 to version 1.1.9 and 2.1.4. In some exemplary embodiments, version 1.1.9 may be associated with a higher importance score than version 2.1.4, such as due to it being a "positive fix". Additionally or alternatively, the importance score of version 1.1.9 may be higher because it may be estimated that applying such a fix would require a fewer number of additional validation cycles than applying the fix of version 2.1.4.

In some exemplary embodiments, a remedial action may be adapted to remedy at least two vulnerabilities of the firmware. For example, one remedial action, e.g., a specific version change, may fix multiple problems and remove two or more vulnerabilities. In another example, deploying a runtime component to protect the firmware from an exploitation of one vulnerability may additionally protect the firmware from an exploitation of another vulnerability, as a side-effect. In some exemplary embodiments, a vulnerability of a firmware may have two or more alternative remedial actions, e.g., since there may be multiple possible ways to deal with one problem. For example, a vulnerability may be fixed manually, fixed automatically, or protected by a software agent. In some cases, there may multiple automatic or manual fixes that may handle a single vulnerability, such as updating the library to one of several potential updated versions (e.g., version 1.1.9, version 2.1.1, version 3.1.10, or the like). In some cases, a remedial action may be configured to remedy a single vulnerability of the firmware.

As an example, a first problem may have determined remedial actions A, B, and C, a second problem may have determined remedial actions A, B and K, and a third problem may have a determined remedial action K. A may have an estimated cost A1, B may have an estimated cost B1, C may have an estimated cost C1, and K may have an estimated cost K1.

In some exemplary embodiments, the estimated costs may comprise two or more cost components, such as for example, development cost and runtime overhead cost. In some exemplary embodiments, for each cost component, a share indication may be received, for example, from a user. The share indication may indicate a weight of each cost component. For example, a user may indicate that a development cost should be considered ⅔ of an overall cost and that a runtime overhead cost should be considered ⅓ of the overall cost. Accordingly, first remedial actions that have a low development cost may be ranked higher in importance than second remedial actions that have a high development cost, e.g., even if the first remedial actions have a higher runtime overhead cost compared to the second remedial actions.

In some exemplary embodiments, remedial action may be scored or ranked according to an importance. In some cases, an importance of a remedial action may grow the more problems it solves. For example, a remedial action which fixes two vulnerabilities may have a higher score that another remedial action which fixes a single vulnerability. Additionally or alternatively, an importance of a remedial action may depend on a type or count of attacks which it protects against. For example, a remedial action which fixes a big issue may be scored higher than a remedial action which fixes a very small issue. Additionally or alternatively, an importance of a remedial action may depend on a weight of each estimated cost component of the remedial action, such that a low cost of a remedial action may increase its importance rate.

In some exemplary embodiments, a remedial action, e.g., each remedial action, may be associated with an estimated cost. The estimated cost may be an estimated monetary cost, an estimated development time in performing the remedial action, an estimated runtime overhead in providing a protection using the runtime component, or the like. In some exemplary embodiments, the estimated cost may be based on estimated development times of offline remedial actions. Additionally or alternatively, the estimated cost may be based on a historic database indicating actual development time and cost for past offline remedial actions that were performed. Additionally or alternatively, the estimated cost may be based on a historic database indicating actual runtime overhead of runtime components providing protection against exploitation of the relevant vulnerability.

In some exemplary embodiments, vulnerabilities, security requirements, or the like may be reported to the user via an alert, a warning, a security warning, or the like. In some exemplary embodiments, the vulnerabilities and security requirements may be reported based on an importance score, a ranking, or a similar metric relating to the vulnerabilities being reported. In some exemplary embodiments, only issues with an importance score above a minimal threshold may be reported. In one example, a library of a firmware may be configured to create a number of user names, e.g., ten user names, each with empty passwords. This may be determined to be a potential security breach, e.g., since ten users may enter without a password. However, since the ten user names are not used by the firmware, an importance score of the potential security breach may be determined to be low, e.g., below a minimal threshold, and thus no security warning may be provided to the user. In another example, a library of a firmware may never be invoked from the firmware's source code ("dead code" library), and additionally the library may have one or more related vulnerabilities. According to this example, a "dead code" warning may be reported to the user, but the one or more vulnerabilities of the library may not be reported, e.g., since an importance score of the one or more vulnerabilities of the library may be determined to be low.

In some exemplary embodiments, vulnerabilities may be fixed in an iterative process, e.g., until no more selected vulnerabilities are detected. The initial cycle or iteration may be insufficient, and may be refined following new iterations. Each cycle may include finding whether there are any new vulnerabilities that are not protected by an agent and were not determined to be ignored. If new vulnerabilities are found, the cycle may continue with determining whether to ignore some vulnerabilities, and determining remedial actions such as runtime patching and fixing for the remaining new vulnerabilities, e.g., according to a determined order or sequence. It is noted that some of the ignored vulnerabilities may be vulnerabilities that were determined by the user to be "false positive". If such vulnerabilities are encountered during runtime, the user may be notified and the vulnerability may no longer be ignored.

In some exemplary embodiments, a fix of one problem or vulnerability in one cycle may cause a new problem or vulnerability to emerge in the following cycle. For example, changing a library version may fix one problem but create another. If a vulnerability is marked or selected by a user to be ignored, it will not show up or be evaluated in following cycles unless it occurred again, e.g., by being invoked from new fixes or from a new iteration. As an example, a "dead code" library of a firmware may have one or more vulnerabilities. During a first iteration, the one or more vulnerabilities may be determined to be ignored as "false positive" since the "dead code" library will never be invoked, such that an importance score of the library is decreased. During the first iteration, the "dead code" library may be fixed, e.g., by modifying the firmware's code to invoke the library. During a second iteration, the one or more vulnerabilities of the library may show up again although they were determined to be ignored previously as false positive vulnerabilities. In such a case, since the fix caused the vulnerabilities to become relevant for the firmware, the user may be notified and the user may decide whether to ignore the vulnerability completely or attend to it as it became relevant.

In some exemplary embodiments, at each cycle, current vulnerabilities of the firmware may be evaluated, e.g., to determine possible remedial actions and estimated costs of the possible remedial actions. In some exemplary embodiments, after running a cycle, a new set of vulnerabilities of the firmware and corresponding new remedial actions may be determined for the firmware. For example, the new set of vulnerabilities may include a new vulnerability replacing a previously fixed vulnerability, and a vulnerability that was previously patched using a runtime component and thus is still valid, e.g., requires runtime protection.

In some exemplary embodiments, at each cycle, the new set of vulnerabilities of the firmware may be analyzed to evaluate an importance level or rank of each vulnerability. In some exemplary embodiments, an importance score for each vulnerability may be utilized to calculate a suitable order or sequence for executing the remedial actions. In some cases, remedial actions may be determined for highly ranked vulnerabilities, e.g., a certain percentile of highest ranked vulnerabilities, vulnerabilities that are ranked above a threshold, or the like.

In some exemplary embodiments, each cycle may end by a user marking to fix, ignore or patch using a runtime component each of the remaining vulnerabilities. As an example, an automatic fixer may suggest to fix certain problems or vulnerabilities, e.g., via fix buttons corresponding to each vulnerability displayed on a user interface. As another example, the automatic fixer may suggest to fix certain problems or vulnerabilities at once, e.g., via one fix button. In some exemplary embodiments, some remedial actions such as fixing may be implemented automatically, e.g., without a user selection or interference. As an example, an automatic fixer may be configured to automatically fix certain, e.g., predefined, problems or vulnerabilities without suggesting the fix to the user.

In some exemplary embodiments, every vulnerability having at least one determined remedial action may be displayed to a user with at least one corresponding button or suggestion indicating possible ways to deal with the vulnerability, such as fix, runtime patch and ignore. As an example, a vulnerability may have a determined manual fix, a determined runtime patch but no determined automatic fix. According to this example, the system may display these options with corresponding estimated costs and a user may decide between available actions such as ignoring the vulnerability, runtime patching the vulnerability, or manually fixing the vulnerability.

In some exemplary embodiments, at some cases an automatic fix may require a user input, e.g., a user selection of at least one parameter or value. The user input may be utilized to automatically fix problems when they occur. For example, the system may suggest to a user to fix a vulnerability using an automatic fix. As an example, consider a vulnerability relating to entering wrong passwords. The automatic fix may include implementing a timeout operation to timeout wrong passwords after a certain time period. According to this example, the user may input a value of a time period, e.g., of 5 seconds, instead of a default time period, e.g., of 2 seconds, for example, which may be implemented automatically upon encountering wrong passwords.

On Step 140, a combination of remedial actions of the set of remedial actions may be determined for the set of vulnerabilities, e.g., based on estimated costs and estimated runtime overheads of the set of remedial actions, e.g., as described herein.

In some exemplary embodiments, a work plan including the combination of remedial actions may be determined for current vulnerabilities, e.g., to get the firmware certified. In some exemplary embodiments, the work plan may include one or more suggestions for vulnerabilities of the firmware, e.g., including at least one of an automatic fix, a manual fix, a runtime patch, or the like. In some cases, there may be vulnerabilities for which no suggestion is provided, e.g., when no manual fix is identified, a cost cannot be estimated, or the like. Such cases may be handled manually at the discretion of the developer of the firmware. Additionally or alternatively, the developer may provide a manual cost estimation to be taken into account in accordance with the disclosed subject matter.

In some exemplary embodiments, the work plan may be created based on determining possible remedial actions, estimating and comparing costs of remedial actions, determining priorities between the remedial actions, comparing an importance of the remedial actions, and determining a recommendation for selecting remedial actions including a sequence of the remedial actions. In some cases, the work plan may exclude remedial actions for vulnerabilities determined to be ignored. For example, the sequence of the remedial actions may include performing remedial actions which include fixing vulnerabilities before remedial actions which include runtime patching vulnerabilities, e.g., which may be an efficient order at least compared to the reverse order.

In some exemplary embodiments, a manual fix, an automated fix, or a runtime patch, may be indicated as part of a work plan or independently. The manual fix, the automated fix, or the runtime patch may be indicated by a fix suggestion providing a task workflow, a cost estimation, a time estimation, a type of worker, expert suiting the task, or the like.

In some exemplary embodiments, the work plan may include scheduling a next cycle of validation of the firmware, e.g., which may be required if the remedial actions create new vulnerabilities.

For example, a firmware may have 50 vulnerabilities. It may be determined that some of the 50 vulnerabilities may be fixed with an automatic or manual fix, that some of the 50 vulnerabilities may be patched using a runtime component, and that some of the 50 vulnerabilities cannot be patched or fixed by the certification scheme. There may be a partial or full overlap between vulnerabilities that are found to be appropriate for runtime patching, manual fixing, and automatic fixing. For example, some vulnerabilities may be appropriate for runtime patching, manual fixing, and automatic fixing; some vulnerabilities may be appropriate for manual fixing and automatic fixing but not runtime patching, and so on.

In some exemplary embodiments, the work plan may include a set or a combination of remedial actions, e.g., including runtime patching or fixing, configured to deal with vulnerabilities based on corresponding costs. In some exemplary embodiments, the combination of remedial actions may be determined based on estimated costs and estimated runtime overheads of remedial actions. In some exemplary embodiments, the combination of remedial actions may be determined based on a limitation on available resources. For example, there may be a limitation over a total development time. Additionally or alternatively, there may be a limitation on an overall runtime overhead. Additionally or alternatively, there may be limitations on additional resources, in addition to or instead of the limitations indicated above.

In some exemplary embodiments, the work plan may be required to take into account one or more user limits and thresholds, e.g., a time requirement or a time limit. The certification scheme may compare and suggest alternative work plans taking into account the vulnerabilities, possible remedial actions, costs, or the like. A work plan may be selected directly by a user, indirectly according to predetermined user conditions, based on a calculation using predefined cost weights, or based on any other method or scheme.

In some exemplary embodiments, the combination of remedial actions may be determined by minimizing an overall estimated cost of the combination, an overall estimated runtime overhead, an overall estimated development time, a combination thereof, or the like. In some exemplary embodiments, the combination may be determined by minimizing one or more target functions, while adhering to a maximal threshold on an overall estimated cost of the combination.

In some exemplary embodiments, determining a recommendation with a combination of remedial actions may comprise solving a set cover problem. A set cover problem may be defined based on the set of remedial actions and based on the vulnerabilities, for example. A set cover problem solver may be utilized to solve the set cover problem, such as, by finding a set of remedial action that deals with all or most of the problems with minimum costs, while adhering to a limit over a resource or resources, such as a limitation on the maximal development time, a limitation on the overall runtime overhead, or the like.

On Step 150, an output based on the combination of remedial actions may be provided to the user. For example, the output may include one or more combinations of remedial actions, each combination configured to fix or deal with the vulnerabilities.

In some exemplary embodiments, the output may include at least one recommendation of remedial actions to be performed. In some exemplary embodiments, the output may comprise an estimated cost of acting according to the recommendation, an estimated development time if the recommendation is performed, an estimated runtime overhead for applying a runtime component according to the recommendation, or the like. In some exemplary embodiments, in response to a user acknowledging or selecting the recommendation, a portion of the remedial actions may be performed automatically. In some exemplary embodiments, automated fixes may be performed automatically. Additionally or alternatively, an automated runtime patching may be performed automatically, such as by configuring a runtime component to provide protection against exploitation of specific vulnerabilities, generating an executable of a runtime component that exclusively provides the protection against exploitation of the specific vulnerabilities, or the like.

In some exemplary embodiments, firmware may be required to be compliant with one or more standards (also referred to as "certifications"), e.g., multiple standards. To determine whether firmware complies with the one or more standards, its vulnerabilities and components may be mapped to different requirements of standards, e.g., simultaneously. For example, a standard may require one or more general or specific fuzzing tests.

In some exemplary embodiments, standards' requirements, e.g., extracted from official standard documents, may be compared to a validation state of the firmware, e.g., including remaining vulnerabilities of the firmware, to determine compliance to the standard.

In some exemplary embodiments, after certifying the firmware device a feedback may be provided to the user indicating that the firmware is secure. In some exemplary embodiments, the feedback may be provided when the firmware is determined to be not vulnerable to any known attacks, tests, or the like. Additionally or alternatively, the feedback may be provided when the firmware fulfills certification requirements. In some cases, official certification documents may be produced. In some exemplary embodiments, when it is determined that the firmware is vulnerable to attacks, a feedback may be provided to the user indicating that the firmware is not compliant to be certified. In some exemplary embodiments, such a feedback may be provided when the firmware does not meet the certification requirements. Additionally or alternatively, when there are no possible remedial actions available or when the firmware is otherwise determined to be incapable of fulfilling certification requirements, an appropriate feedback may be provided.

In some exemplary embodiments, firmware validation results of previously inspected firmware devices may be stored, retained, kept, or the like, for example, on a server, a cloud, a storage apparatus, or the like. In some exemplary embodiments, a new firmware device for inspection may be processed and its validation results after being certified may be compared to previously inspected firmware devices. In some cases, a ranking of the new firmware device may be determined in comparison to similar firmware products.

In one example, a device for validation may include a router. A user may purchase the router and may wish to determine whether the router's firmware is safe to work with, e.g., without being able to modify the firmware's code or housing device. In some cases, a safety feedback of the router's firmware may be provided, e.g., indicating safe actions that can be performed with the firmware, and actions that are not safe to perform with the firmware, e.g., due to the firmware's vulnerabilities. For example, if a firmware has a vulnerability that originates from a camera of the firmware device, the safety feedback may indicate that use of the camera is not safe. The router's firmware may be compared to firmware, e.g., of routers, communication devices, or the like, for example, to provide a score, a rating, a statistical analysis, or a similar metric, based on validation results from the inspected router and previous validation results of other devices. For example, a router's results, e.g., which may include a result of 80% validation, may be determined to be at the top 2% compared to other routers. As another example, the new firmware may be determined to be in a specific percentile among similar products, such as in the top 10% of the most secured firewalls, in the bottom 15% of the most vulnerable IP phones, or the like.

In some exemplary embodiments, products may be classified according to a certification requirement, certified by automatically creating documents that may be required by one or more related or commonly required standards, or the like. For example, an IC2443 standard may require a full list of software components of a tested device or program. This list may be created automatically for this requirement, thus qualifying the tested device to be compliant with the IC2443 standard.

In some exemplary embodiments, providing the output to the user may include updating the firmware to be immune from a first portion of the vulnerabilities, configuring the runtime component to protect against exploitation of a second portion of the vulnerabilities, or the like. In some exemplary embodiments, the first and second portion may or may not overlap.

Figure 3:
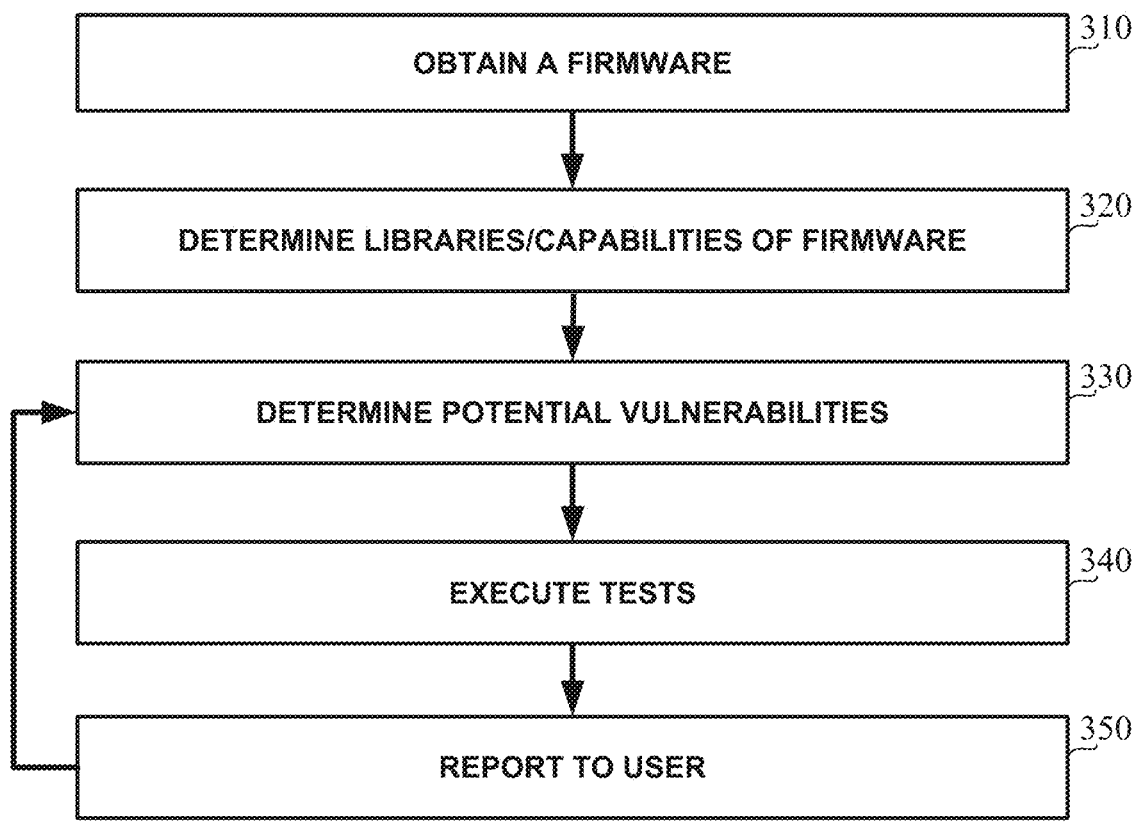
FIG. 3 shows a flowchart of a method, in accordance with some exemplary embodiments of the disclosed subject matter.

Referring now to FIG. 3 showing a flowchart diagram of a method, in accordance with some exemplary embodiments of the disclosed subject matter.

On Step 310, a new firmware may be obtained. In some exemplary embodiments, the new firmware may be required to be certified or validated. The firmware may be provided with a source code thereof. Additionally or alternatively, the firmware may be provided without access to its source code.

On Step 320, libraries of the firmware may be automatically identified.

In some exemplary embodiments, in order to identify capabilities or libraries used by the firmware, reverse engineering thereof may be performed. In some cases, reverse engineering may be performed on the binary of the firmware to identify libraries used by the firmware, capabilities of the firmware, or the like. In some exemplary embodiments, a set of libraries that are used in the firmware may be identified for the firmware, such as comprising different versions of a library, different libraries, or the like. In some exemplary embodiments, the set of libraries may be identified using static analysis. Such an analysis may be performed using string matching, checking dynamic patterns, or the like.

Additionally or alternatively, init files of the firmware, may be obtained and analyzed. For example, the init file may pointed to by scripts located in the "init.d" directory in the Linux™ operating system. Drivers invoked by the init files may be determined. In some exemplary embodiments, based on which drivers are invoked by the init files of the firmware, the capabilities of the firmware may be identified.

Additionally or alternatively, user documentations may be searched for libraries used by the firmware, and the capabilities thereof. In some cases, the documentation may indicate which protocols that firmware supports, and therefore indicate capabilities thereof. As another example, the firmware may indicate which sensors, antennas, sockets or other hardware components of the device it utilizes, and therefore indicate relevant capabilities.

In some exemplary embodiments, based on identified libraries in the firmware, the vulnerabilities database may be consulted to determine the capabilities associated with the identified libraries.

On Step 330, potential vulnerabilities of the firmware may be determined. In some cases, the potential vulnerabilities may be determined by traversing the vulnerabilities database and obtaining each vulnerability associated with a capability or library that is found in the firmware.

In some exemplary embodiments, each vulnerability and test may be associated with a probability of the functionality not working properly for a library/capability. Such probability may be computed based on empirical results of executing the test. In some cases, resources required by the test (or estimation thereof) may be indicated, such as Central Processing Unit (CPU) time, network throughput, bandwidth, memory usage, or the like. In some exemplary embodiments, some tests may be considered mandatory, such that they must be performed every iteration. In some cases, such mandatory tests may be implemented regardless of their probability, e.g., even if their probability is very low. In some cases, mandatory tests may be assigned a probability of 100% or more, e.g., to ensure they will be implemented every iteration.

In some exemplary embodiments, given an amount of resources available for validating the firmware, an optimal set of tests may be determined. In some cases, the optimal set may be a set of tests which maximizes a formula, e.g., as follows:

$$\max \Sigma p_i, s.t. \Sigma r_i \leq R \quad (1)$$

wherein $p_i$ is the probability of test i failing, $r_i$ is the resources required for test i, and R being the total amount of resources available for the validation process. In some exemplary embodiments, the probability $p_i$ may be determined based on the reason for test i being considered relevant for the firmware. For example, the same test may have different probabilities for different capabilities or libraries. In some cases, some tests may be considered mandatory, such that they must be performed every iteration. Such mandatory tests may be tested regardless of the probability and the total amount of resources R may be the remaining resources after testing the mandatory tests. Additionally or alternatively, mandatory tests may be assigned a value of $p_i$=100% or higher so as to bias the optimization to select those tests.

Additionally or alternatively, the optimal set may be a set of tests which maximizes a number of different bugs that are found using the available resources (R). In some exemplary embodiments, each test may have a probability function of showing a bug associated with each vulnerability. The application of tests may be determined so as to increase the total number of bugs associated with different vulnerabilities that are found. In some exemplary embodiments, such an optimization may be useful to avoid focusing testing on the "easiest" bugs, that can be exposed relatively easily and with high probability, using different tests.

On Step 340, tests may be executed to determine whether the firmware works properly or not. In some cases, the executed tests may be the subset of tests given available resources.

On Step 350, the vulnerabilities may be reported to a user. In some exemplary embodiments, the user may fix or patch the firmware in order to overcome the vulnerability, e.g., by replacing a library, using a different version of the same library, or the like.

In some exemplary embodiments, the user may update the firmware and provide a new version thereof. Steps 330-350 may be repeated until no more vulnerabilities are found or if no solution is found. In case no more vulnerabilities are found, the firmware may be certified. In some cases, during re-evaluation, each test that previously failed may be re-executed. In some cases, other tests may be executed as well, including other tests that the previous version passed and tests that were not tested before. The determination of which tests to execute on the new version may be based on which vulnerabilities previously existed (which tests passed and which failed). In some cases, big data analysis may be used to determine the likelihood of a fix to vulnerability causing another previously-passed vulnerability to fail.

In some exemplary embodiments, a firmware database may retain information about firmware. For each firmware, the firmware database may indicate libraries and capabilities that exist in the firmware.

It will be noted that the databases may comprise a large number of entries. For example, the vulnerabilities database may comprise 100,000 or more entries, each relating to a different capability or library, while the firmware database may comprise myriad of more entries, each of which relating to a different firmware.

In some exemplary embodiments, the firmware database may map firmware with capabilities or libraries, information of which may be retained in the vulnerabilities database.

Figure 4:
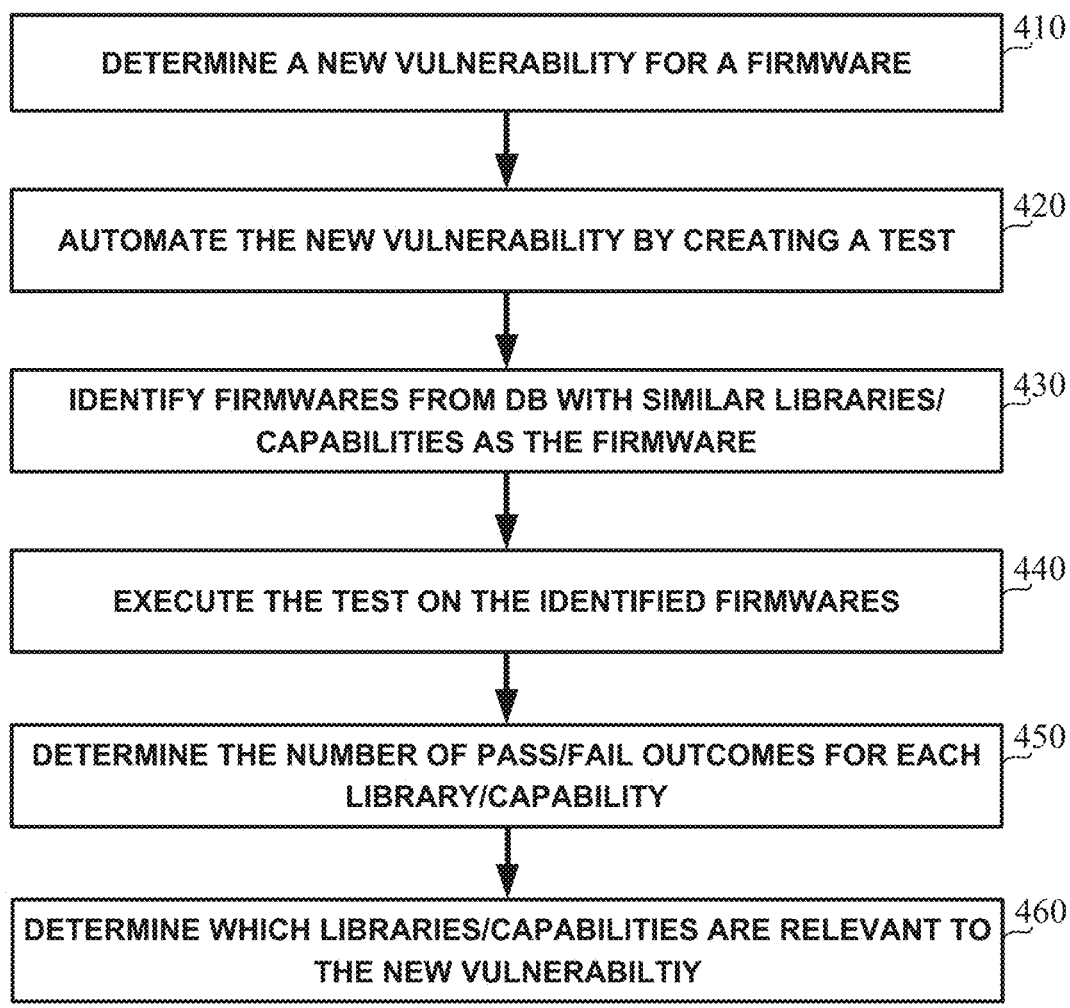
FIG. 4 shows a flowchart of a method, in accordance with some exemplary embodiments of the disclosed subject matter.

Referring now to FIG. 4 showing a flowchart diagram of a method, in accordance with some exemplary embodiments of the disclosed subject matter.

On Step 410, a new vulnerability for a firmware may be determined. In some exemplary embodiments, the new vulnerability may be a cyber-security vulnerability or breach that may be exploited in an attack. In some exemplary embodiments, the new vulnerability may be a zero-day vulnerability: an attacker may create a new attack that attacks a firmware that was not previously known and therefore was not previously tested. Additionally or alternatively, a new vulnerability may be a new feature that the firmware should support, such as based on modification of a utilized protocol.

In some exemplary embodiments, the firmware for which the new vulnerability is applicable may already be included in the databases. For example, a firmware database may indicate which capabilities firmware has and which libraries firmware utilizes. However, the vulnerabilities database may not include the new vulnerability as a vulnerability associated with any capability or library. It may be desired to identify which capability or library is relevant for the new vulnerability.

On Step 420, automation of exploitation of the new vulnerability may be created. In some cases, an automated test or attack for the new vulnerability may be created. In some exemplary embodiments, a developer may create code that utilizes the new vulnerability and which could be applied on a firmware to determine whether the firmware has the new vulnerability or not.

On Step 430, firmware from the firmware database with similar libraries or capabilities as the firmware may be identified. In some cases, the firmware database may indicate that the firmware may have a list of capabilities/libraries C1 . . . CN. Each firmware which has at least one of the capabilities/libraries C1 . . . CN may be identified.

On Step 440, the test may be executed on each identified firmware. A pass/fail outcome may indicate whether the new vulnerability was found in each of the identified firmware.

However, the vulnerabilities database does not indicate relations between firmware and vulnerabilities, but rather relations between capabilities/libraries and vulnerabilities. Hence, further computation may be performed to determine to which capabilities/libraries the new vulnerability is relevant.

On Step 450, for each library or capability, the number of failed and passed tests may be computed. For example, for each capability/library Ci ($1 \leq i \leq N$), the number of firmware products that included the capability/library may be Ti. The test was executed Ti times with respect to Ci and failed Fi times. Hence, the likelihood of the new vulnerability being relevant to capability/library Ci may be computed as $F_i/T_i$, and denoted as Pi. In the present example, the vulnerabilities database provides partial information which enables the association of capability/library to a firmware.

In some exemplary embodiments, a capability/library of a firmware may be determined based on a historic database including test results of libraries accumulated over time. A number of failed and passed tests of the firmware may be compared to test results from the historic database, e.g., to infer capabilities/libraries that are characterized by similar results. The similar capabilities/libraries may correspond to the capabilities/libraries of the firmware, thus providing the capabilities/libraries of the firmware even when they are difficult to obtain, e.g., when a code of the firmware is not available, or the like.

On Step 460, the capabilities/libraries for which the new vulnerability is relevant may be estimated. In some cases, the top-most capabilities/libraries according to their Pi value may be determined as relevant, for example the five top-most firmware products, the 10% top-most firmware products, or the like. Additionally or alternatively, a minimal threshold value may be used to determine which capabilities/libraries are not relevant. If Pi is below the threshold, the new vulnerability may be determined to be not relevant to the capability/library Ci.

In some exemplary embodiments, the vulnerability and firmware databases may be updated. In some exemplary embodiments, the vulnerabilities database may be updated so that in each entry of capability/library deemed for which the new vulnerability is deemed relevant, the new vulnerability is added. After such update, new firmware having the relevant capability/library may be tested for the new vulnerability. As can be appreciated, the first database is updated in an automated manner without requiring comprehensive user investigation into the causes of the new vulnerability.

Additionally or alternatively, the vulnerabilities database may be updated to include for each library/capability Ci ($1 \leq i \leq N$), the new vulnerability together with its computed probability Pi. Such probability may be used when selecting vulnerabilities to be tested. It is also noted that the probability may be updated each time a new firmware is tested (i.e. updated to either $F_i/T_i+1$ or $F_i+1/T_i+1$ depending on the outcome of pass or fail), hence the probability evaluation may be improved overtime and be adapted based on empirical evidence.

In some exemplary embodiments, one or more users may be informed to resolve the newly discovered issue of the new vulnerability existing in other firmware products besides the new firmware. In some cases, if the issue is not resolved, the certification of the firmware may be revoked.

Figure 5:
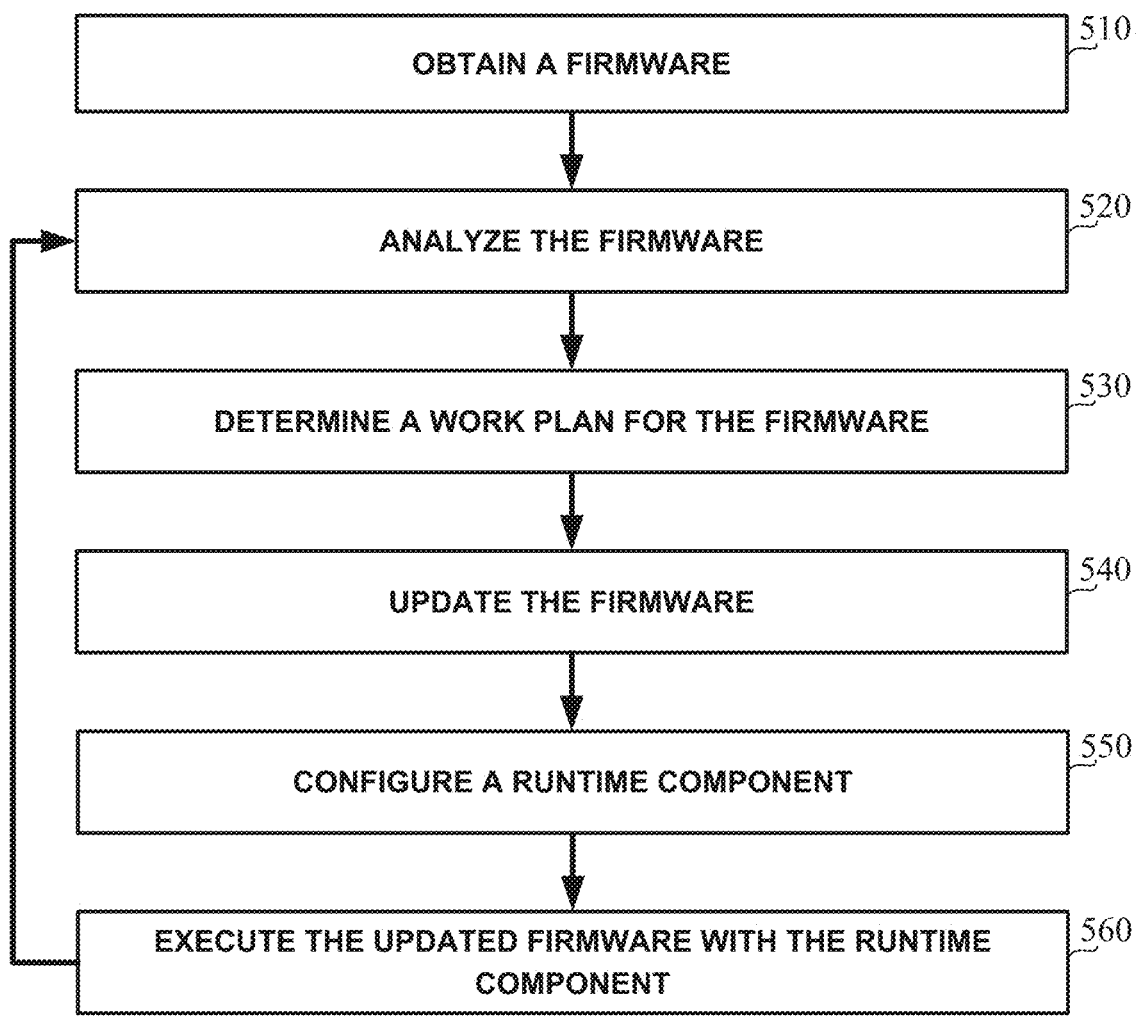
FIG. 5 shows a flowchart of a method, in accordance with some exemplary embodiments of the disclosed subject matter.

Referring now to FIG. 5 showing a flowchart diagram of a method, in accordance with some exemplary embodiments of the disclosed subject matter.

On Step 510, a firmware is obtained. In some exemplary embodiments, the firmware may be a low-level software which can directly access hardware. In some cases, firmware code or binary may be obtained from a firmware product such as an IoT device, from an autodumper, from a computing device, or the like. In other cases, firmware code or binary may be obtained directly from a user, a server, or the like via any form of communication.

On Step 520, the firmware may be analyzed, for example, to determine libraries utilized by the firmware, capabilities of the firmware, capabilities of the firmware product, or the like. In some exemplary embodiments, vulnerabilities of the firmware may be determined based on a database relating to the libraries and capabilities of the firmware. In some cases, the vulnerabilities of the firmware may include at least first and second portions of vulnerabilities.

On Step 530, a work plan for the firmware may be determined. In some cases, the work plan may include a recommended combination of remedial actions to remedy at least the first and second portions of vulnerabilities. For example, remedial actions for the first portion of vulnerabilities may include offline remedial actions, and remedial actions for the second portion of vulnerabilities may include online remedial actions. In some cases, remaining vulnerabilities that are excluded from the work plan may be ignored. In some exemplary embodiments, a user may determine whether to accept, modify or reject the work plan. Modifying the work plan may include changing a remedial action of a vulnerability, indicating that a vulnerability should be excluded from the work plan, indicating that an excluded vulnerability should be included in the work plan, or the like.

On Step 540, the firmware may be updated. In some cases, updating the firmware may include applying one or more offline remedial actions to the firmware to remedy the first portion of vulnerabilities, e.g., according to the work plan. The one or more offline remedial actions may include manual remedial actions or automatic remedial actions, which may be initiated by the user or automatically. In some exemplary embodiments, after fixing the first portion of vulnerabilities, an updated firmware, that is immune to an exploitation of the first portion of vulnerabilities, may be provided.

On Step 550, a runtime component may be configured. The runtime component may be specifically tailored to protect the firmware against exploitation of the second portion of vulnerabilities during execution of the firmware. In some exemplary embodiments, the runtime component may be a binary generated to protect the firmware against the exploitation of the second portion of vulnerabilities. Additionally or alternatively, the runtime component may be an existing binary that is configured, such as using parameters, configuration, instructions, or the like, to perform operations that protect against the exploitation of the second portion of vulnerabilities. In some exemplary embodiments, the runtime component may be configured to avoid performing at least one functionality that is aimed at protecting against a vulnerability that is not included in the second portion of vulnerabilities.

Steps 520-550 may be repeated until no more vulnerabilities that are not protected by the runtime component are found, until a certification requirement relating to the vulnerabilities is fulfilled, or if no solution is found.

In some exemplary embodiments, the first and second portion of vulnerabilities may be modified between iterations. For example, during a first iteration, vulnerabilities A, B, and C may be handled by the runtime component of Step 560. However, during a second iteration, an updated firmware may not have vulnerability A but may become vulnerable to a vulnerability M. Accordingly, during the second iteration, vulnerabilities B, C, and M may be handled by an updated runtime component that may be specifically tailored to protect the firmware against exploitation of vulnerabilities B, C, and M.

On Step 560, the runtime component may be executed with the updated firmware, e.g., provided on step 540. During execution of the updated firmware, the runtime component may protect the updated firmware from exploitation of the second portion of vulnerabilities.

Figure 6:
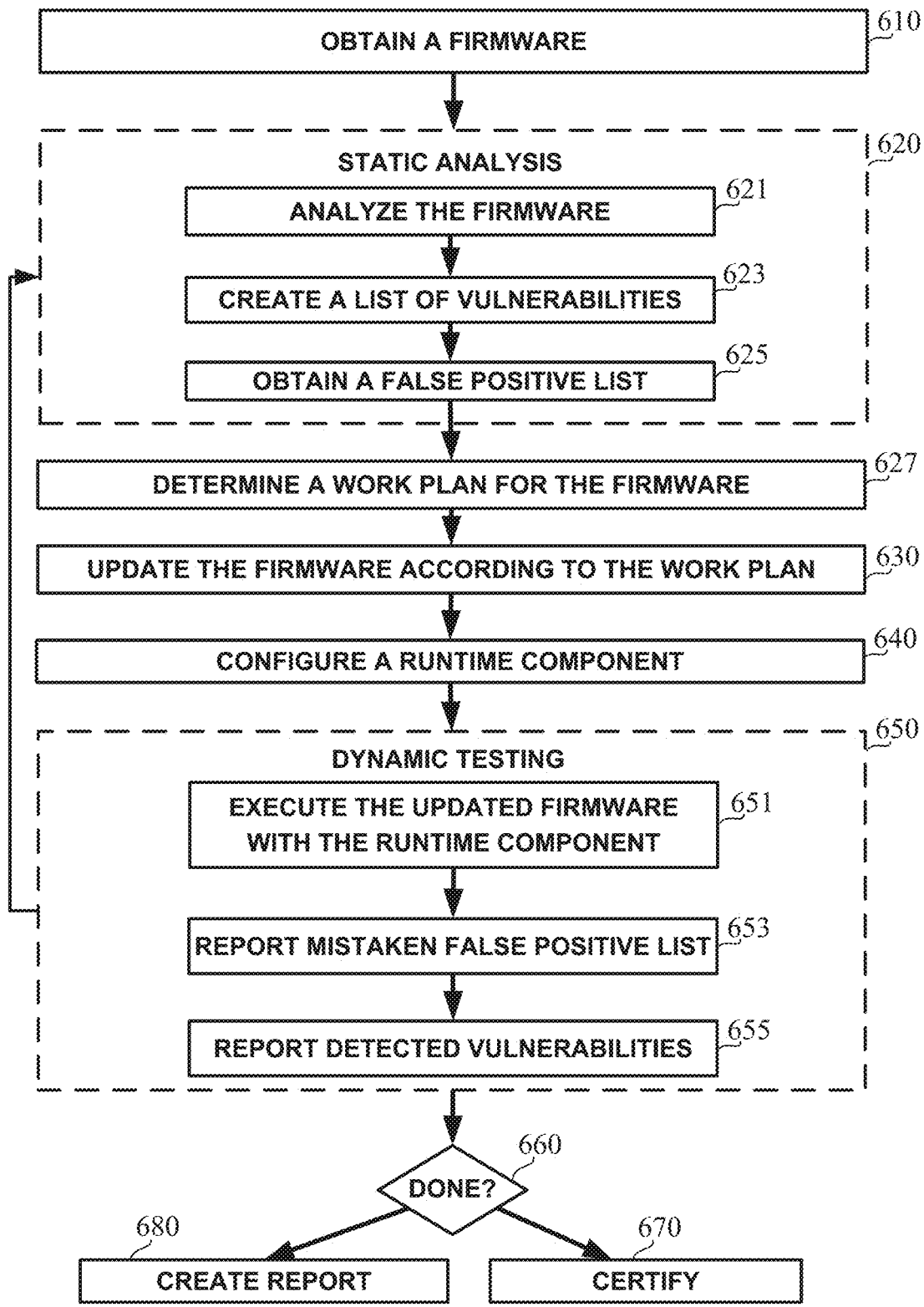
FIG. 6 shows a flowchart of a method, in accordance with some exemplary embodiments of the disclosed subject matter.

Referring now to FIG. 6 showing a flowchart diagram of a method, in accordance with some exemplary embodiments of the disclosed subject matter.

On Step 610, a firmware is obtained. In some cases, firmware code or binary may be obtained from a firmware product such as an IoT device, from an autodumper, from a computing device, or the like. In other cases, firmware code or binary may be obtained directly from a user, a server, a cloud, or the like.

On Step 620, a static analysis of the firmware is performed. The static analysis may include analyzing the firmware (621), for example, to determine libraries utilized by the firmware, capabilities of the firmware, capabilities of the firmware product, or the like. In some exemplary embodiments, the static analysis may include creating a list of vulnerabilities (623), for example, based on the libraries or capabilities of the firmware.

In some exemplary embodiments, the list of vulnerabilities may include vulnerabilities that are determined to be associated with the firmware, that are determined to be valid for the firmware, that are determined to have an importance score above a threshold, or the like.

In some exemplary embodiments, and as the vulnerabilities may be determined in static analysis means, some detected vulnerabilities may be detected although they do not in actuality exist. One such example may be in case of a vulnerability that is present within a dead code. In some exemplary embodiments, the user may provide a list of false positive vulnerabilities (625). Additionally or alternatively, the user may indicate for each vulnerability in the list obtained in Step 623, whether such vulnerability is considered by the user as false positive and should be ignored, or not.

Additionally or alternatively, the user may mark additional vulnerabilities to be ignored, even if such vulnerabilities do exist within the firmware. Additionally or alternatively, the user may set to ignore vulnerabilities that are not required to be resolved for certification purposes, vulnerabilities that are of low severity score (e.g., below a threshold), or the like.

On Step 627, a work plan for the firmware may be determined. In some exemplary embodiments, the work plan for the firmware may include a combination of remedial actions configured to deal with the list of vulnerabilities of the firmware by fixing a first portion of the list of vulnerabilities, runtime patching to protect a second portion of the list of vulnerabilities, or the like. In some exemplary embodiments, vulnerabilities that are indicated as false positive or indicated to be ignored may not necessarily be handled, and no remedial action may be selected specifically to treat such vulnerabilities. It is noted, however, that other remedial actions that are applied to resolve other vulnerabilities may, as a side effect, resolve the ignored vulnerabilities as well.

On Step 630, the firmware may be updated according to the work plan. In some exemplary embodiments, updating the firmware may include applying one or more offline remedial actions to the firmware to remedy the first portion of the list of vulnerabilities, e.g., prior to an execution of the firmware. The one or more offline remedial actions may include manual remedial actions or automatic remedial actions, which may be initiated by the user or automatically.

On Step 640, a runtime component may be configured according to the work plan. The runtime component may be specifically tailored to protect the firmware against exploitation of the second portion of the list of vulnerabilities during execution of the firmware.

On Step 650, dynamic testing of the updated firmware may be performed. In some exemplary embodiments, the testing of the firmware may be implemented during execution of the updated firmware together with the runtime component (651), e.g., to test whether the runtime component functions properly, whether the updated firmware functions properly, whether the combination thereof functions properly, or the like. In some exemplary embodiments, the testing may be focused on testing the list of vulnerabilities of the firmware, such that a majority or a large share of tests are configured to test the list of vulnerabilities. In some cases, the testing of the firmware may include testing the false-positive list of vulnerabilities, such that a minority or small share of tests are configured to test the false-positive list of vulnerabilities.

In some exemplary embodiments, the testing of the updated firmware may provide a list of vulnerabilities that are valid for the firmware. In some cases, a valid vulnerability may emerge when the runtime component does not function properly, when the updated firmware does not function properly, or the like. In some cases, a valid vulnerability may emerge from a fix of a previous vulnerability, e.g., a "negative" fix. In some cases, a valid vulnerability may emerge from the false-positive list of vulnerabilities, e.g., when the false-positive list includes a valid vulnerability that was determined to be invalid during the static analysis step such that it was not addressed by the work plan.

In some exemplary embodiments, dynamic testing may be implemented in parallel to the static analysis of Step 620, e.g., in addition to or instead of the dynamic testing of Step 650. For example, parallel testing may test the firmware to provide a list of vulnerabilities that are valid for the firmware, e.g., prior to any update of the firmware and prior to a configuration of the runtime component. In some exemplary embodiments, the parallel testing may test the firmware without executing the runtime component to mask and protected against exploitations of vulnerabilities of the firmware. In another example, the parallel testing may be implemented at any other stage or iteration. For example, the parallel testing of a firmware updated during a certain iteration may take place in parallel to a static analysis of a subsequent iteration. In some cases, parallel testing may test an entire system under development, a certain area of a system under development, or the like. In some cases, the parallel testing may utilize a plurality of test templates generated by a test template generator or by any other software or hardware module.

On Step 653, mistaken false positive vulnerabilities indicated on Step 625, may be reported. In some exemplary embodiments, the false-positive list may be tested, and a mistaken false-positive list may be reported to a user, e.g., together with any other vulnerability identified during the testing. In some exemplary embodiments, the user may then indicate whether to ignore the vulnerability nonetheless, or whether such vulnerability should be handled, in the next iteration of the process.

On Step 655, detected vulnerabilities that were not detected by the static analysis step may be reported. In some exemplary embodiments, some vulnerabilities that were not detected by the static analysis stage may be detected during the dynamic testing of Step 650, during a parallel testing, or the like. Any new vulnerability identified during the testing may be reported to a user. In some exemplary embodiments, the user may then indicate whether to ignore the new vulnerability, or whether such vulnerability should be handled, for example, in the next iteration of the process. In some exemplary embodiments, information regarding vulnerabilities that were not detected during static analysis may be reported to a server, to be utilized to improve the static analysis. In some cases, machine learning based static analysis models may be retrained using the additional information to improve their accuracy. Additionally or alternatively, a human developer may review the information to test and improve the system module performing the static analysis.

Steps 620-650 may be repeated until the verification is determined to be completed on Step 660. In some cases, the verification may be determined to be completed when no more vulnerabilities that remain exploitable (e.g., not fixed in the firmware and are not protected by the runtime component) are found, until a certification requirement relating to the firmware is fulfilled, until no work plan can be determined for all remaining vulnerabilities, or the like.

In some exemplary embodiments, in every iteration, a user may receive the list of vulnerabilities of the firmware from the static analysis step, and determine user-selected vulnerabilities to be ignored. In some cases, the user-selected vulnerabilities to be ignored may not be tested on Step 650, unless they emerge again from a new iteration or fix. In some exemplary embodiments, the user may indicate a vulnerability to be ignored in future iterations, and such selection may persist and be reused in the next iterations as well.

In some exemplary embodiments, if the verification is determined to be completed on Step 660, the method may progress towards Step 670, Step 680, combination thereof, or the like.

On Step 670, in case the firmware complies with a set of certification requirements, the firmware may be deemed as certified. In some exemplary embodiments, the firmware may be certified if it complies with certification requirements, if it is not susceptible to certain potential exploitations, if it is configured to function properly when a predetermined set of attacks are employed, or the like. In some exemplary embodiments, a firmware may be certified if it passes execution of a set of benchmark tests or attacks. In some exemplary embodiments, a certification diploma may be printed or otherwise produced. Additionally or alternatively, a database of certified firmware products may be updated, such as online accessible list of firmwares that are certified in accordance with a specific certification. The database may be updated to reflect the fact that the firmware is certified, the list of vulnerabilities that still exist within it, the list of attacks that it withstood, metadata describing its operation while being tested or attached, or the like. In some exemplary embodiments, a certification report may be provided to a user, such as an owner of the firmware, a certification agent who asked for the certification of the firmware, or the like.

On Step 680, a report may be provided. The report may indicate a list of libraries employed by the firmware, versions of utilized libraries, set of capabilities of the firmware, or the like. In some exemplary embodiments, as part of a certification requirement it may be required to furnish the capabilities and libraries report, and the disclosed subject matter may provide such report automatically. Additionally or alternatively, the report may include vulnerabilities that still exist in the firmware, indication for each vulnerability whether it is being protected by the runtime component, indication for each vulnerability whether the user requested that it be ignored, a list of vulnerabilities that were indicated as false positives, or the like.

Figure 7:
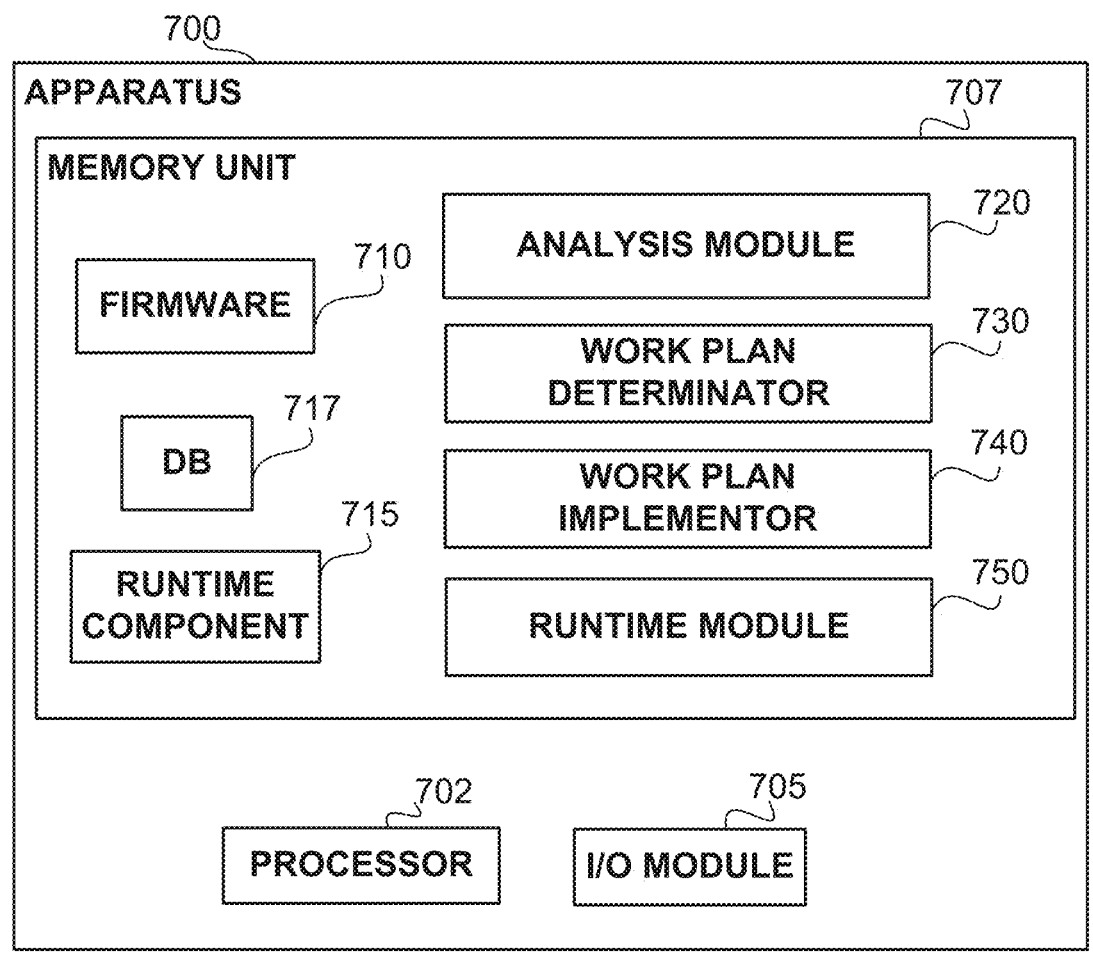
FIG. 7 shows a block diagram of an apparatus, in accordance with some exemplary embodiments of the disclosed subject matter.

Referring now to FIG. 7 showing a block diagram of components of an apparatus, in accordance with some exemplary embodiments of the disclosed subject matter.

In some exemplary embodiments, an Apparatus 700 may comprise a Processor 702. Processor 702 may be a Central Processing Unit (CPU), a microprocessor, an electronic circuit, an Integrated Circuit (IC) or the like. Processor 702 may be utilized to perform computations required by Apparatus 700 or any of its subcomponents. Processor 702 may be configured to execute computer-programs useful in performing the method of FIG. 1, FIG. 3, FIG. 4, FIG. 5, FIG. 6, or the like.

In some exemplary embodiments of the disclosed subject matter, an Input/Output (I/O) Module 705 may be utilized to provide an output to and receive input from a user. I/O Module 705 may be operatively coupled to a firmware device (not shown) intended for inspection and verification. I/O Module 705 may be operatively coupled to a display (not shown), speaker (not shown) or a similar device which may be used for providing feedback to the user. I/O Module 705 may further be used to transmit and receive information to and from the user, a firmware, a firmware device, or any other apparatus in communication therewith.

In some exemplary embodiments, Apparatus 700 may comprise a Memory Unit 707. Memory Unit 707 may be a short-term storage device or long-term storage device. Memory Unit 707 may be a persistent storage or volatile storage. Memory Unit 707 may be a disk drive, a Flash disk, a Random Access Memory (RAM), a memory chip, or the like. In some exemplary embodiments, Memory Unit 707 may retain program code operative to cause Processor 702 to perform acts associated with any of the subcomponents of Apparatus 700. In some exemplary embodiments, Memory Unit 707 may retain program code operative to cause Processor 702 to perform acts associated with any of the steps in FIG. 1, FIG. 3, FIG. 4, FIG. 5, and FIG. 6.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

Analysis Module 720 may be configured to detect vulnerabilities of a Firmware 710, e.g., based on information obtained from Firmware 710 via I/O Module 705 or from any other source. Analysis Module 720 may be configured to analyze the vulnerabilities of Firmware 710 to determine a set of potential remedial actions for the set vulnerabilities, and corresponding estimated costs. In some exemplary embodiments, Analysis Module 720 may utilize Database (DB) 717 to identify vulnerabilities based on libraries, conditions, parameters, or the like. Database 717 may include a vulnerabilities database, an attack database, a firmware database, an historic database, or the like. The vulnerabilities database may further comprise potential remedial actions for a vulnerability, one or more tests to examine the susceptibility to the vulnerability, or the like.

Work Plan Determinator 730 may be configured to propose a work plan of implementation of a subset of the remedial actions determined by Analysis Module 720. In some exemplary embodiments, Work Plan Determinator 730 may be configured to devise a plan that is estimated to be performed without exceeding predetermined resource thresholds, such as maximal development time, maximal runtime overhead, or the like. In some exemplary embodiments, the work plan may be configured to protect against exploitation of a subset of the vulnerabilities. The subset of vulnerabilities may comprise vulnerabilities that are required to be handled in order for Firmware 710 to be certified, vulnerabilities identified in Firmware 710 and not manually designated to be ignored, or the like. In some exemplary embodiments, the user may select which vulnerabilities he wishes to fix or patch, and which vulnerabilities he wishes to ignore, e.g., via I/O Module 705. In some exemplary embodiments, the work plan may be, at least partially, implemented automatically, such as by updating libraries to newer versions thereof. Additionally, or alternatively, the work plan may comprise, at least partially, implementation of runtime protection, such as through the use of a runtime component.

Work Plan Determinator 730 may be configured provide to a user, e.g., via the display or via I/O Module 705, a combination of remedial actions which are suggested to the user. Additionally, or alternatively, the work plan may be provided to the user. In some exemplary embodiments, the user may accept, modify or reject the work plan. If the user rejects the work plan, Work Plan Determinator 730 may determine an alternative work plan. Additionally, or alternatively, if the user accepts the work plan (with or without modifications), the work plan may be implemented, at least partially, in an automated manner by Work Plan Implementor 740.

Work Plan Implementor 740 may be configured to implement automatically, at least in part, a work plan. Work Plan Implementor 740 may be configured to implement offline remedial actions, such as updating libraries in Firmware 710 to remove vulnerabilities thereof. In some exemplary embodiments, updating libraries may be performed automatically or semi-automatically. As an example, a library may be updated automatically, and thereafter, manual development may be required, such as to adjust Firmware 710 to a new Application Programming Interface (API) of the updated library. Additionally, or alternatively, Work Plan Implementor 740 may be configured to implement online remedial actions using Runtime Module 750.

In some exemplary embodiments, Runtime Module 750 may be configured to employ Runtime Component 715 to provide protection against exploitation of one or more vulnerabilities to which Firmware 710 is susceptible. Runtime Module 750 may be configured to create an embedded runtime component, e.g., including a software product that is embedded in Firmware 710, a software product separated from Firmware 710 and executed together therewith on the same device, or the like. In some cases, Runtime Module 750 may configure an existing runtime component to protect, during execution of Firmware 710, Firmware 710 against exploitation of a specific set of vulnerabilities of the firmware. For example, based on the work plan devised by Work Plan Determinator 730 and implemented by Work Plan Implementor 740, a subset of the remedial actions available via Runtime Component 715 may be utilized. In some cases, Runtime Module 750 may configure Runtime Component 715 to activate a subset of the protection capabilities related to the specific set of vulnerabilities.

It is noted that Firmware 710 is illustrated as being retained in Memory Unit 707, although, in some embodiments, Firmware 710 may be retained elsewhere, such as in the firmware device itself, external storage, or the like. Additionally, or alternatively, Firmware 710 may be provided in binary form, source code form, or the like. Additionally or alternatively, it is noted that DB 717 is illustrated as being retained in Memory Unit 707, although, in some embodiments, DB 717 may be retained elsewhere, such as in the firmware device itself, external storage, or the like.

Figure 8:
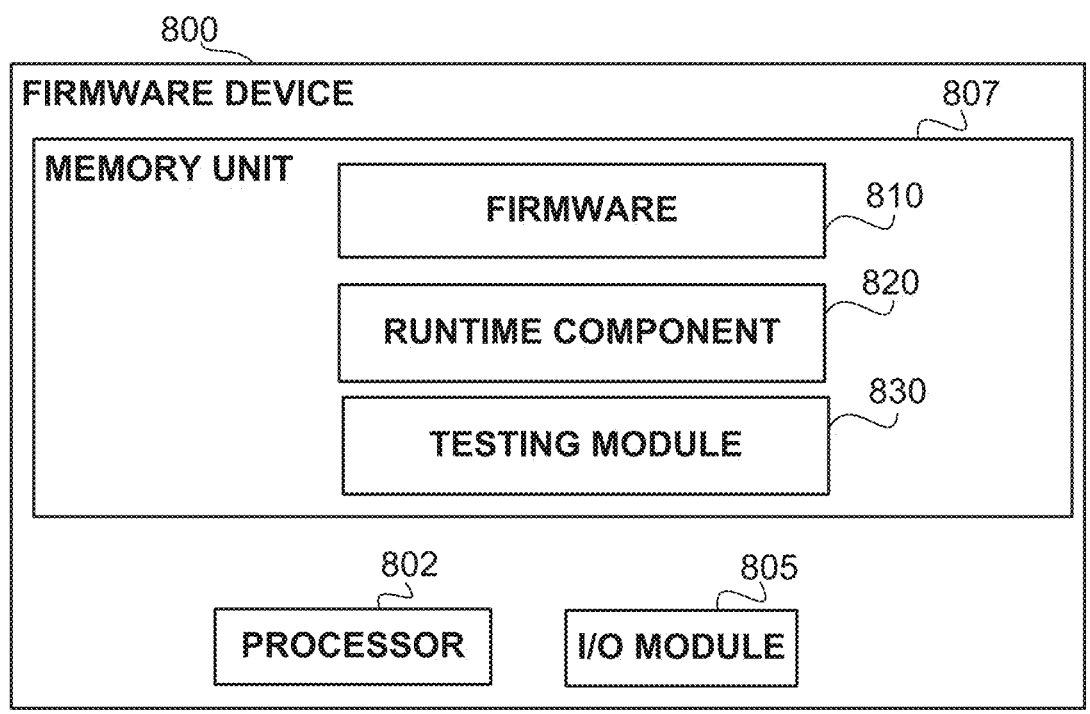
FIG. 8 shows a block diagram of a firmware device, in accordance with some exemplary embodiments of the disclosed subject matter.

Referring now to FIG. 8 showing a block diagram of components of a firmware device, in accordance with some exemplary embodiments of the disclosed subject matter.

In some exemplary embodiments, Firmware Device 800 may include an IoT device, a computing device, or the like. In some exemplary embodiments, Firmware Device 800 may include a Firmware 810 which needs to be certified and a Processor 802. Processor 802 may be a Central Processing Unit (CPU), a microprocessor, an electronic circuit, an Integrated Circuit (IC) or the like. Processor 802 may be utilized to perform computations required by Firmware Device 800 or any of its subcomponents.

In some exemplary embodiments of the disclosed subject matter, an Input/Output (I/O) Module 805 may be utilized to provide an output to and receive input from a user. I/O Module 805 may be operatively coupled to Firmware 810 which may be intended for inspection or verification. I/O Module 805 may be operatively coupled to any peripheral device for receiving user input or providing user output. In some exemplary embodiments, I/O Module 805 may be used to transmit and receive information to and from the user, or any other apparatus in communication therewith.

In some exemplary embodiments, Firmware Device 800 may comprise a Memory Unit 807. Memory Unit 807 may be a short-term storage device or long-term storage device. Memory Unit 807 may be a persistent storage or volatile storage. Memory Unit 807 may be a disk drive, a Flash disk, a Random Access Memory (RAM), a memory chip, or the like. In some exemplary embodiments, Memory Unit 807 may retain program code operative to cause Processor 802 to perform acts associated with any of the subcomponents of Firmware Device 800.

The components detailed below may be implemented as one or more sets of interrelated computer instructions, executed for example by Processor 802 or by another processor. The components may be arranged as one or more executable files, dynamic libraries, static libraries, methods, functions, services, or the like, programmed in any programming language and under any computing environment.

Firmware 810, such as Firmware 710 of FIG. 7, may be a firmware product. In some exemplary embodiments, Firmware 810 may be a low-level software which can directly access hardware. Firmware 810 may have a plurality of vulnerabilities, at least one vulnerability having a condition, corresponding parameters, or the like. In some exemplary embodiments, Firmware 810 may be executed on Firmware Device 800.

Testing Module 830 may be configured to execute tests for a set of vulnerabilities of Firmware 810. The set of vulnerabilities may be identified by an analysis module, such as Analysis Module 720 of FIG. 7. The tests may be obtained from a vulnerabilities database, such as DB 717 of FIG. 7, provided by a developer, a server, or the like. In some exemplary embodiments, Testing Module 830 may be configured to apply the tests during an execution of Firmware 810 on Firmware Device 800. In some exemplary embodiments, Testing Module 830 may obtain a test template and generate tests based thereon during execution of Firmware 810.

Runtime Component 820, such as Runtime Component 715 of FIG. 7, may be configured to protect Firmware 810 against exploitation of specific vulnerabilities to which Firmware 810 is susceptible. Runtime Component 820 may protect Firmware 810 during the execution thereof on Firmware Device 800. In some exemplary embodiments, Runtime Component 820 may be a custom-generated binary specifically configured to protect against the relevant vulnerabilities. Additionally, or alternatively, Runtime Component 820 may be a general binary that is capable of protecting against a superset of vulnerabilities and that is customized to protect against the relevant vulnerabilities. In some cases, Runtime Component 820 may be configured to activate protection capabilities related to the specific vulnerabilities of Firmware 810. In some exemplary embodiments, Runtime Component 820 may be embedded in Firmware 810, in a software product separated from Firmware 810 and executed together therewith on Firmware Device 800, or the like. In some exemplary embodiments, Runtime Component 820 may be configured to perform online remedial actions, each of which may protect against exploitation of at least one vulnerability. In some cases, a remedial action may protect against exploitation of a plurality of vulnerabilities, only to some of which Firmware 810 is susceptible.

Referring now to FIG. 9 showing a screenshot of an exemplary report, in accordance with some exemplary embodiments of the disclosed subject matter. In some exemplary embodiments, Report 900 may correspond to the report provided on Step 680 (FIG. 6). Additionally or alternatively, Report 900 may be an interactive screen in a Graphical User Interface (GUI).

In some exemplary embodiments, Report 900 may be generated for a firmware, and may be provided to a user. Report 900 may include a summary of the verification and certification situation of the firmware. The verification and certification situation of the firmware may be determined in accordance with the disclosed subject matter, such as based on the dynamic testing of the firmware, the static analysis of the firmware, or the like.

In some exemplary embodiments, Report 900 may indicate existing Vulnerabilities 920, Security Requirements 910, alerts, security breaches, or the like.

As shown in FIG. 9, Vulnerabilities 920 is empty, since no vulnerability appearing in the publically available CVE system was found in the firmware. In other cases, Vulnerabilities 920 may include any detected vulnerability such as vulnerabilities detected by the static analysis, vulnerabilities detecting by dynamic testing, or the like. In some exemplary embodiments, overview of the number of CVEs of different severities may be indicated, such as critical, high, medium, and low.

As shown in FIG. 9, Security Requirements 910 includes 87 security requirements for the firmware. In other cases, any other number of security requirements may be determined, e.g., based on certification requirements, standard requirements, user requirements, or the like. In some exemplary embodiments, overview of the security requirements may be provided, such as a number of security requirements that have been met ("done"), and a number of requirements in each importance category (high, medium, low, or the like).

In some exemplary embodiments, Vulnerabilities 920 and Security Requirements 910 may be reported based on an importance score, a severity, a ranking, or a similar metric. As shown in FIG. 9, Vulnerabilities 920 and Security Requirements 910 may be ranked according to severity, e.g., from low to critical or high. In some exemplary embodiments, issues that have been resolved may also be included in Report 900.

Report 900 may indicate recommendations to address one or more issues of the firmware. In some cases, recommendations may include a combination of remedial actions to address a vulnerability or a security requirement of the firmware, including offline remedial actions, online remedial actions, or a combination thereof. In some exemplary embodiments, Report 900 may indicate an overall threat level of the firmware based on a number of security breaches, remaining Security Requirements 910, a severity of the security breaches, a severity of the security requirements, or the like. In some exemplary embodiments, Report 900 may indicate a readiness level of the firmware for certification, for example, based on a number of remaining Vulnerabilities 920, a severity of the remaining Vulnerabilities 920, or the like.

In some exemplary embodiments, Report 900 may comprise additional information such as but not limited to vendor identification, type classification of the device, model of the device, product version, firmware file, firmware version, file size, analysis time, or the like. Additionally or alternatively, a number of components of the device may be provided, such as a number of identified hardware components, their identity and other information, a number of identified software components, their identity and other information, or the like.

Figure 10:
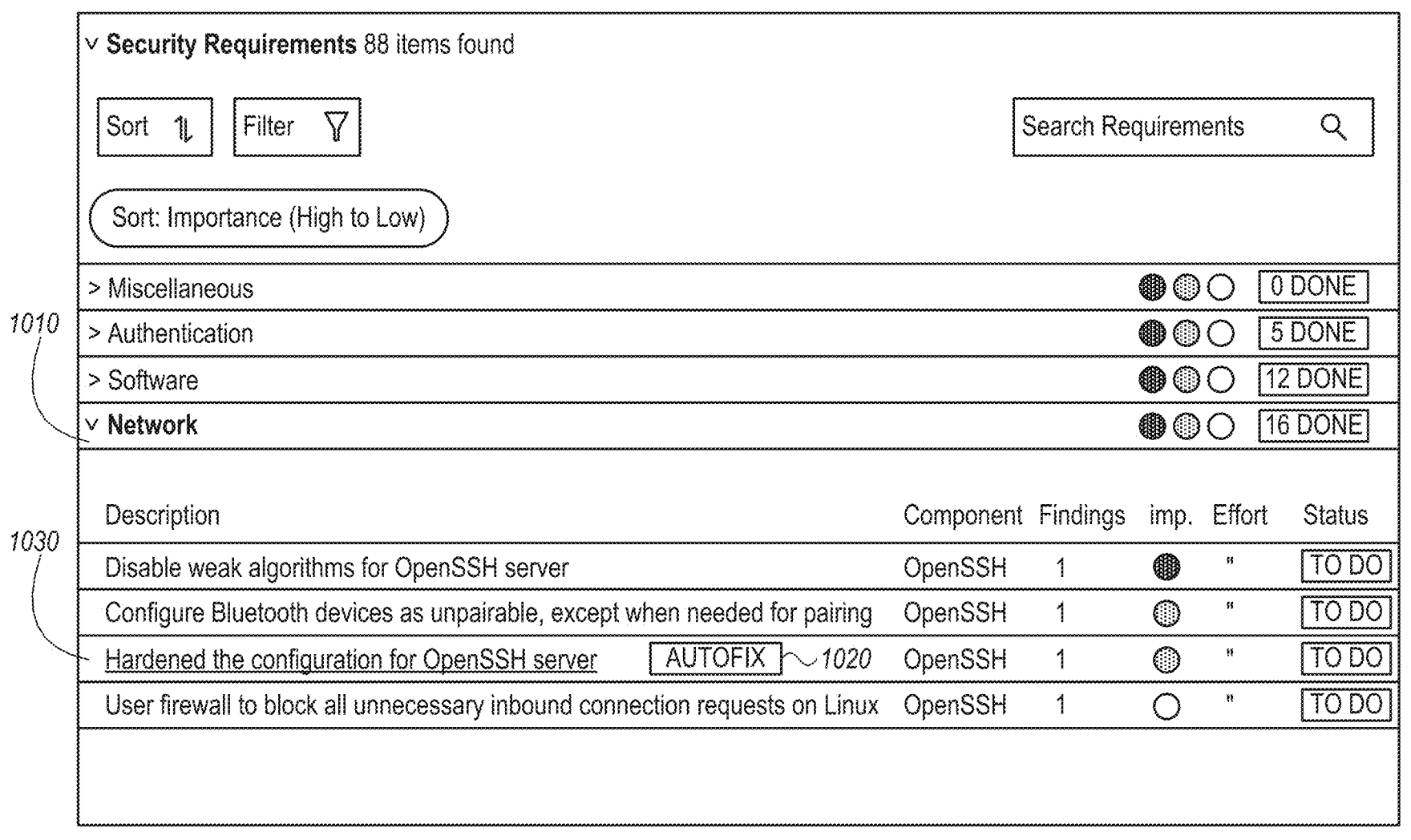

Referring now to FIG. 10 showing a screenshot of a security requirement report, in accordance with some exemplary embodiments of the disclosed subject matter. In some exemplary embodiments, security requirements may correspond to Security Requirements 910 of Report 900 in FIG. 9.

As shown in FIG. 10, security requirements of a firmware may include a plurality of requirements regarding a security of the firmware, such as Network Requirements 1010, authentication requirements, software requirements, procedural requirements, architecture requirements, or the like.

As shown in FIG. 10, Network Requirements 1010 may include a list of remedial actions for fixing network breaches or complying with network requirements. For example, Network Requirements 1010 may relate to firmware or software components of the firmware device that are associated with a network, to network connection hardware components, or the like. For example, network breaches may include security problems related to Bluetooth™, security problems related to secure network utilities such as OpenSSH™, security problems related to Linux™ or to any other operating system, or the like. Network Requirements 1010 may list remedial actions including offline, online remedial actions, or a combination thereof.

In some exemplary embodiments, an Automatic Fix 1020 may be suggested to enable the firmware to comply with one or more network requirements. As shown in FIG. 10, Network Requirements 1010 may comprise a Network Requirement 1030 that requires a firmware to harden a configuration of an OpenSSH™ server. In other cases, any other network-related requirement may be provided. Additionally or alternatively, any other type of fix may be suggested to enable the firmware to comply with Network Requirements 1010, such as runtime patching, manual fixing, or the like. As shown in FIG. 10, a manual fix is suggested for Network Requirement 1030, e.g., in addition to Automatic Fix 1020, but no runtime patching is available. Accordingly, a user may select to address Network Requirement 1030 by implementing Automatic Fix 1020, e.g., by pressing on the corresponding button, or by implementing a manual fix, e.g., according to received directions.

In some exemplary embodiments, each requirement may be associated with an importance indication, an estimated effort level, such as indicating estimated cost, a status (e.g., "to do" or "done"), or the like. Grouping of requirements, such as Network Requirements 1010 may include information regarding a total number of requirements in each different importance level, a total number of completed requirements, a total number of remaining "to do" requirements, a total number of "to do" requirements of each different importance level, or the like.

Referring now to FIG. 11 showing a screenshot of exemplary remedial actions suggested for a security requirement, in accordance with some exemplary embodiments of the disclosed subject matter. In some exemplary embodiments, Network Requirement 1130 may correspond to Network Requirement 1030 of FIG. 10.

As shown in FIG. 11, a security requirement of the firmware may include Network Requirement 1130. Remedial actions may be suggested to the firmware to enable it to comply with Network Requirement 1130. The suggested remedial actions may include offline remedial actions such as automatic fixing and manual fixing. In other cases, suggested remedial actions may include online remedial actions.

As shown in FIG. 11, a manual fix of the firmware is suggested via a Written Guide 1110 that explains the Network Requirement 1130 and how to address the Network Requirement 1130 with a manual fix. Additionally, Written Guide 1110 may provide Standards 1140 that are relevant for Network Requirement 1130, files and code that are relevant to Network Requirement 1130, and suggested code modifications with corresponding code locations. As shown in FIG. 11, in addition to the manual fix, an Automatic Fix 1120 is suggested as well, e.g., in Written Guide 1110 or at any other location. In some cases, Automatic Fix 1120 may be selected via a corresponding button that, when pressed, fixes the security issue automatically. In other cases, Automatic Fix 1120 may be selected via any other user interface element.

In some exemplary embodiments, Written Guide 1110 may provide an explanation regarding Network Requirement 1110, including a summary of the meaning of such requirement, potential related exploits or attacks, explanation as to how the related vulnerability was identified, associated files, or the like.

In some exemplary embodiments, Automatic Fix 1120 may be selected using a GUI widget, which may automatically apply a patch to the code or to a configuration file to handle the requirement and fix the vulnerability. Additionally or alternatively, the user may interact with another GUI widget to view the suggest fix before it is automatically applied.

Referring now to FIG. 12 showing a screenshot of an exemplary automatic fix of a security requirement, in accordance with some exemplary embodiments of the disclosed subject matter. In some exemplary embodiments, the automatic fix of the security requirement may correspond to Automatic Fix 1120 of Network Requirement 1130 of FIG. 11.

As shown in FIG. 12, an automatic fix of a security requirement may include one or more modifications of a firmware's code, such as source code or configuration file, one or more lines to be added, one or more lines to be removed, one or more lines to be modified, or the like. In some cases, visualization of the modifications may be presented to the user, before or after the automatic fix is applied. In some exemplary embodiments, different types of code changes may be marked or otherwise displayed in a different manner, such as using a "diff" utility. For example, lines that are suggested to be deleted may be marked with a certain color such as red, and lines that are suggested to be added may be marked with a different color such as green. Lines to be modified may be indicated using yellow lines. An Original Version 1200a may be displayed together with a Modified Version 1200b.

As shown in FIG. 12, Line 1210 may be determined to be removed from the firmware's configuration file, while Lines 1220 may be determined to be added to the firmware's configuration file. In some cases, selecting an automatic fix may remove Line 1210 automatically, and add Lines 1220 automatically, e.g., thus causing the firmware to comply with the related network requirement.

In some exemplary embodiments, in accordance with the disclosed subject matter, a set of vulnerabilities of the firmware may be determined based on a vulnerabilities database, wherein the vulnerabilities database comprises known vulnerabilities of libraries. The determination may comprise identifying in the vulnerabilities database vulnerabilities corresponding to each library of the list of libraries, whereby obtaining potential vulnerabilities. The determination may further comprise determining that a specific vulnerability of the potential vulnerabilities is not valid according to a predefined condition associated with the specific vulnerability and omitting the specific vulnerability from the potential vulnerabilities to provide the set of vulnerabilities. In some exemplary embodiments, a set of remedial actions for the set of vulnerabilities may be determined. In some exemplary embodiments, the set of remedial actions may consist exclusively either online remedial actions and offline remedial actions. In some exemplary embodiments, the offline remedial actions may be remedial actions that fix one or more vulnerabilities in the firmware prior to an execution of the firmware, by updating program instructions or configuration files of the firmware. In some exemplary embodiments, each offline remedial action is associated with an estimated development time, which may or may not be above zero. In some exemplary embodiments, the online remedial actions may be remedial actions performed by a runtime component that protects the firmware from exploitations of one or more vulnerabilities during the execution of the firmware. In some exemplary embodiments, each online remedial action may be associated with an estimated runtime overhead, which may or may not be above zero. In some exemplary embodiments, the set of remedial actions comprises at least one remedial action that is adapted to remedy at least two vulnerabilities of the firmware, wherein the set of remedial actions comprises at least two alternative remedial actions for a vulnerability of the firmware. In some exemplary embodiments, a combination of remedial actions of the set of remedial actions for the set of vulnerabilities may be determined. In some exemplary embodiments, the combination of remedial actions may be determined based on a limitation on a total development time of applying all offline remedial actions in the combination of remedial actions. In some exemplary embodiments, the combination of remedial actions may be determined based on a limitation on a total runtime overhead of applying all online remedial actions in the combination of remedial actions. In some exemplary embodiments, a user may be provided with a list of the offline remedial actions in the combination of remedial actions. In some exemplary embodiments, the combination is determined based on a minimization of an overall estimated development time of the combination. Additionally or alternatively, the combination may be determined based on minimization of an overall estimated runtime overhead while adhering to a maximal threshold on an overall estimated development time of the combination. In some exemplary embodiments, at least one offline remedial action can be applied automatically, whereby the user is enabled to update, manually or automatically, the firmware to be immune from a first portion of the set of vulnerabilities. In some exemplary embodiments, in response to a user acknowledging the at least one offline remedial action that can be applied automatically, the at least one offline remedial action may be performed automatically. In some exemplary embodiments, the runtime component may be configured to protect against exploitation of a second portion of the set of vulnerabilities, whereby during execution of the updated firmware together with the configured runtime component, the updated firmware is not susceptible to any vulnerability of the first and second portions of the set of vulnerabilities.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a list of libraries utilized by a firmware;
    determining a set of vulnerabilities of the firmware based on a vulnerabilities database, wherein the vulnerabilities database comprises known vulnerabilities of libraries, wherein said determining comprises:
        identifying in the vulnerabilities database vulnerabilities corresponding to each library of the list of libraries, whereby obtaining potential vulnerabilities;
        determining that a specific vulnerability of the potential vulnerabilities is not valid according to a predefined condition associated with the specific vulnerability; and
        omitting the specific vulnerability from the potential vulnerabilities to provide the set of vulnerabilities;
    determining a set of remedial actions for the set of vulnerabilities, wherein the set of remedial actions consists online remedial actions and offline remedial actions,
        wherein the offline remedial actions are remedial actions that fix one or more vulnerabilities in the firmware prior to an execution of the firmware, by updating program instructions or configuration files of the firmware, wherein each offline remedial action is associated with an estimated development time,
        wherein the online remedial actions are remedial actions performed by a runtime component that protects the firmware from exploitations of one or more vulnerabilities during the execution of the firmware, wherein each online remedial action is associated with an estimated runtime overhead,
        wherein the set of remedial actions comprises at least one remedial action that is adapted to remedy at least two vulnerabilities of the firmware, wherein the set of remedial actions comprises at least two alternative remedial actions for a vulnerability of the firmware;
    determining for the set of vulnerabilities a combination of remedial actions of the set of remedial actions, wherein the combination of remedial actions is determined based on a limitation on a total development time of applying all offline remedial actions in the combination of remedial actions, wherein the combination of remedial actions is determined based on a limitation on a total runtime overhead of applying all online remedial actions in the combination of remedial actions; and
    providing a user with a list of the offline remedial actions in the combination of remedial actions, wherein at least one offline remedial action can be applied automatically, whereby the user is enabled to update, manually or automatically, the firmware to be immune from a first portion of the set of vulnerabilities; and
    configuring the runtime component to protect against exploitation of a second portion of the set of vulnerabilities;
    whereby during execution of the updated firmware together with the configured runtime component, the updated firmware is not susceptible to any vulnerability of the first and second portions of the set of vulnerabilities.

2. The method of claim 1, wherein the offline remedial action comprises at least one of an automatic fix of the first vulnerability and a manual fix of the first vulnerability.

3. The method of claim 1, wherein the offline remedial action comprises updating a library of the list of libraries to a different version of the library that is not vulnerable to the vulnerability.

4. The method of claim 1, wherein said obtaining comprises obtaining firmware code and detecting the list of libraries based on the firmware code.

5. The method of claim 4 further comprises executing the firmware on a computing machine to obtain the firmware code from a memory of the computing machine.

6. The method of claim 5, wherein said executing the firmware comprises querying a runtime system of the firmware to determine the list of libraries.

7. The method of claim 1, wherein in response to a user acknowledging the at least one offline remedial action that can be applied automatically, performing the at least one offline remedial action automatically.

8. The method of claim 1, wherein said determining the combination comprises:
    defining a set cover problem based on the set of remedial actions and based on the set of vulnerabilities; and
    automatically solving the set cover problem.

9. The method of claim 1, wherein said determining the combination comprises minimizing an overall estimated development time of the combination.

10. The method of claim 1, wherein said determining the combination comprises minimizing an overall estimated runtime overhead while adhering to a maximal threshold on an overall estimated development time of the combination.

11. The method of claim 1, wherein said determining the set of vulnerabilities is determined to include vulnerabilities associated with a standard requirement or a certification requirement.

12. The method of claim 1 comprising, after said providing, determining a new set of vulnerabilities and corresponding new remedial actions comprising a first remedial action that fixes a third vulnerability in the firmware prior to the execution of the firmware, and a second remedial action that protects the firmware from the exploitation of the second vulnerability during the execution of the firmware.

13. The method of claim 1 comprising providing a work plan configured to certify the firmware, said work plan comprising an estimated total development time and a set of instructions to be performed manually by a developer for implementing at least one offline remedial action.

14. The method of claim 1, wherein the estimated development time of the at least one offline remedial action that can be applied automatically is zero.

15. A computer program product comprising a non-transitory computer readable storage medium retaining program instructions, which program instructions when read by a processor, cause the processor to perform:

obtaining a list of libraries utilized by a firmware;

determining a set of vulnerabilities of the firmware based on a vulnerabilities database, wherein the vulnerabilities database comprises known vulnerabilities of libraries, wherein said determining comprises:

identifying in the vulnerabilities database vulnerabilities corresponding to each library of the list of libraries, whereby obtaining potential vulnerabilities;

determining that a specific vulnerability of the potential vulnerabilities is not valid according to a predefined condition associated with the specific vulnerability; and omitting the specific vulnerability from the potential vulnerabilities to provide the set of vulnerabilities;

determining a set of remedial actions for the set of vulnerabilities, wherein the set of remedial actions consists online remedial actions and offline remedial actions, wherein the offline remedial actions are remedial actions that fix one or more vulnerabilities in the firmware prior to an execution of the firmware, by updating program instructions or configuration files of the firmware, wherein each offline remedial action is associated with an estimated development time, wherein the online remedial actions are remedial actions performed by a runtime component that protects the firmware from exploitations of one or more vulnerabilities during the execution of the firmware, wherein each online remedial action is associated with an estimated runtime overhead, wherein the set of remedial actions comprises at least one remedial action that is adapted to remedy at least two vulnerabilities of the firmware, wherein the set of remedial actions comprises at least two alternative remedial actions for a vulnerability of the firmware;

determining for the set of vulnerabilities a combination of remedial actions of the set of remedial actions, wherein the combination of remedial actions is determined based on a limitation on a total development time of applying all offline remedial actions in the combination of remedial actions, wherein the combination of remedial actions is determined based on a limitation on a total runtime overhead of applying all online remedial actions in the combination of remedial actions; and providing a user with a list of the offline remedial actions in the combination of remedial actions, wherein at least one offline remedial action can be applied automatically, whereby the user is enabled to update, manually or automatically, the firmware to be immune from a first portion of the set of vulnerabilities; and configuring the runtime component to protect against exploitation of a second portion of the set of vulnerabilities;

whereby during execution of the updated firmware together with the configured runtime component, the updated firmware is not susceptible to any vulnerability of the first and second portions of the set of vulnerabilities.

16. The computer program product of claim 15, wherein the offline remedial action comprises at least one of an automatic fix of the first vulnerability and a manual fix of the first vulnerability.

17. The computer program product of claim 15, wherein the offline remedial action comprises updating a library of the list of libraries to a different version of the library that is not vulnerable to the vulnerability.

18. The computer program product of claim 15, wherein said obtaining comprises obtaining firmware code and detecting the list of libraries based on the firmware code.

19. The computer program product of claim 18, wherein the firmware code is obtained from a memory of a computing machine, wherein the computing machine is utilized to execute the firmware.

20. The computer program product of claim 15, wherein in response to a user acknowledging the at least one offline remedial action that can be applied automatically, performing the at least one offline remedial action automatically.

21. The computer program product of claim 15, wherein said determining the combination comprises:

defining a set cover problem based on the set of remedial actions and based on the set of vulnerabilities; and automatically solving the set cover problem.

22. The computer program product of claim 15, wherein said determining the combination comprises minimizing an overall estimated development time of the combination.

23. The computer program product of claim 15, wherein said determining the combination comprises minimizing an overall estimated runtime overhead while adhering to a maximal threshold on an overall estimated development time of the combination.

24. The computer program product of claim 15, wherein said determining the set of vulnerabilities is determined to include vulnerabilities associated with a standard requirement or a certification requirement.

25. The computer program product of claim 15, wherein the instructions, when read by the processor, cause the processor to perform, after said providing, determining a new set of vulnerabilities and corresponding new remedial actions comprising a first remedial action that fixes a third vulnerability in the firmware prior to the execution of the firmware, and a second remedial action that protects the firmware from the exploitation of the second vulnerability during the execution of the firmware.

26. The computer program product of claim 15, wherein the instructions, when read by the processor, cause the processor to perform: providing a work plan configured to certify the firmware, said work plan comprising an estimated total development time and a set of instructions to be performed manually by a developer for implementing at least one offline remedial action.

27. The computer program product of claim 15, wherein the estimated development time of the at least one offline remedial action that can be applied automatically is zero.

28. A computerized apparatus having a processor and memory, the processor being adapted to perform:

obtaining a list of libraries utilized by a firmware;

determining a set of vulnerabilities of the firmware based on a vulnerabilities database, wherein the vulnerabilities database comprises known vulnerabilities of libraries, wherein said determining comprises:

identifying in the vulnerabilities database vulnerabilities corresponding to each library of the list of libraries, whereby obtaining potential vulnerabilities;

determining that a specific vulnerability of the potential vulnerabilities is not valid according to a predefined condition associated with the specific vulnerability; and omitting the specific vulnerability from the potential vulnerabilities to provide the set of vulnerabilities;

determining a set of remedial actions for the set of vulnerabilities, wherein the set of remedial actions consists online remedial actions and offline remedial actions,
- wherein the offline remedial actions are remedial actions that fix one or more vulnerabilities in the firmware prior to an execution of the firmware, by updating program instructions or configuration files of the firmware, wherein each offline remedial action is associated with an estimated development time,
- wherein the online remedial actions are remedial actions performed by a runtime component that protects the firmware from exploitations of one or more vulnerabilities during the execution of the firmware, wherein each online remedial action is associated with an estimated runtime overhead,
- wherein the set of remedial actions comprises at least one remedial action that is adapted to remedy at least two vulnerabilities of the firmware, wherein the set of remedial actions comprises at least two alternative remedial actions for a vulnerability of the firmware;

determining for the set of vulnerabilities a combination of remedial actions of the set of remedial actions, wherein the combination of remedial actions is determined based on a limitation on a total development time of applying all offline remedial actions in the combination of remedial actions, wherein the combination of remedial actions is determined based on a limitation on a total runtime overhead of applying all online remedial actions in the combination of remedial actions; and providing a user with a list of the offline remedial actions in the combination of remedial actions, wherein at least one offline remedial action can be applied automatically, whereby the user is enabled to update, manually or automatically, the firmware to be immune from a first portion of the set of vulnerabilities; and configuring the runtime component to protect against exploitation of a second portion of the set of vulnerabilities;

whereby during execution of the updated firmware together with the configured runtime component, the updated firmware is not susceptible to any vulnerability of the first and second portions of the set of vulnerabilities.

\* \* \* \* \*